US008951452B2

(12) United States Patent
Parnas et al.

(10) Patent No.: US 8,951,452 B2
(45) Date of Patent: Feb. 10, 2015

(54) PROCESS FOR PARTICLEBOARD MANUFACTURE

(71) Applicant: University of Connecticut, Farmington, CT (US)

(72) Inventors: Richard Parnas, Ashford, CT (US);
Alexandru Asandei, Vernon, CT (US);
Sudsiri Hemsri, Bangkok (TH);
Timothy Dowding, Stamford, CT (US)

(73) Assignee: University of Connecticut, Farmington, CT (US)

( * ) Notice: Subject to any disclaimer, the term of this patent is extended or adjusted under 35 U.S.C. 154(b) by 200 days.

(21) Appl. No.: 13/651,017

(22) Filed: Oct. 12, 2012

(65) Prior Publication Data

US 2014/0054816 A1  Feb. 27, 2014

Related U.S. Application Data

(60) Provisional application No. 61/546,615, filed on Oct. 13, 2011.

(51) Int. Cl.
*B27N 1/00* (2006.01)
*B29D 7/01* (2006.01)
*B29B 13/06* (2006.01)

(52) U.S. Cl.
CPC . *B29B 13/06* (2013.01); *B27N 1/00* (2013.01); *B29D 7/01* (2013.01)
USPC ......................................................... 264/109

(58) Field of Classification Search
None
See application file for complete search history.

(56) References Cited

U.S. PATENT DOCUMENTS

| | | | |
|---|---|---|---|
| 4,814,422 A | | 3/1989 | Diem et al. |
| 4,977,231 A | * | 12/1990 | McVay et al. ................. 528/142 |
| 5,322,873 A | | 6/1994 | Pohl et al. |
| 6,197,414 B1 | | 3/2001 | Kawai et al. |
| 6,207,720 B1 | | 3/2001 | Maeda et al. |
| 6,420,034 B1 | | 7/2002 | Takahashi et al. |
| 6,692,670 B2 | | 2/2004 | Moriarty et al. |
| 7,387,756 B2 | | 6/2008 | Guilbert et al. |
| 7,527,858 B2 | | 5/2009 | Lundquist |
| 7,803,855 B2 | | 9/2010 | Kintzley et al. |
| 2003/0091804 A1 | | 5/2003 | Li et al. |
| 2006/0042506 A1 | * | 3/2006 | Woerdeman et al. ...... 106/125.1 |
| 2009/0169909 A1 | * | 7/2009 | Jarck ............................ 428/541 |
| 2010/0015194 A1 | * | 1/2010 | Donath et al. ................ 424/409 |

FOREIGN PATENT DOCUMENTS

| | | |
|---|---|---|
| WO | 99/02318 | 1/1999 |
| WO | 2010/147936 | 12/2010 |
| WO | WO 2013/056120 | 4/2013 |

OTHER PUBLICATIONS

PCT International Search Report and Written Opinion dated Dec. 21, 2012, PCT/US2012/060060.
Prasad et al., Alkali Treatment Of Coir-Polyester Composites, Journal of Materials Science, 18(5), 1443-1454, 1983.
Varma et al., Coir Fibers II: Evaluation as a Reinforcement in Unsaturated Polyester Resin Composites, Journal of Reinforced Plastics and Composites, 4(4), 419-429, 1985.
Sampathrajan et al., Mechanical and Thermal Properties of Particle Boards Made from Farm Residues, Bioresources Technology 40(3), 249-251, 1992.
Geethamma et al., Composite of Short Coir Fibres and Natural Rubber: Effect of Chemical Modification, Loading and Orientation of Fibre, Journal of Applied Polymer Science 55(4), 583-594, 1995.
Maloney, T.M., The Family Of Wood Composite Materials, Forest Products Journal, 46(2), 19-26, 1996.
Takasaki et al., Formation of Protein-Bound 3,4-Dihydroxyphenylalanine and 5-S-Cysteinyl-3, 4-Dihydroxyphenylalanine As New Cross-Linkers In Gluten, J. Agric. Food Chem. 45, 3472, 1997.
Geethamma et al., Composite of Short Coir Fibres and Natural Rubber: Effect of Chemical Modification, Loading and Orientation of Fibre, Polymer, 39(6-7), 1483-1491, 1998.
Viswanathan et al., Mechanical Properties of Coir Pith Particle Board, Bioresource Technology, 67(1), 93-95, 1999.
Saheb et al., Natural Fiber Polymer Composites: A Review, Advances in Polymer Tech., 18(4), 351-363, 1999.
Baumann, M.G.D., Aldehyde Emission From Particleboard And Medium Density Fiberboard Products, Forest Products Journal, 50(9), 75-82, 2000.
Hill et al., Effect of Fiber Treatments on Mechanical Properties of Coir or Oil Palm Fiber Reinforced Polyester Composites, J. of Applied Polymer Science (2000) 78(9), 1685-97.
Hill et al., The Effect Of Environmental Exposure Upon The Mechanical Properties Of Coir Or Oil Palm Fiber Reinforced Composites, J. of Applied Polymer Science, 77(6), 1322-1330, 2000.
Rozman et al., The Effect Of Lignin As A Compatibilizer On The Physical Properties of Coconut Fiber-Polypropylene Composites, Eur. Polym. J., 36(7), 1483-1494, 2000.

(Continued)

*Primary Examiner* — Mary F Theisen
(74) *Attorney, Agent, or Firm* — McCarter & English, LLP

(57) ABSTRACT

Improved particleboard and methods for fabricating improved particleboard (e.g., natural fiber/material-based particleboard) are disclosed. More particularly, the present disclosure provides systems/methods for fabricating particleboard (e.g., formaldehyde-free particleboard) utilizing natural fibers/materials (e.g., lignocellulosic materials), wherein the particleboard has improved performance characteristics and/or mechanical properties. Methods for fabricating fiber-reinforced biocomposites (e.g., natural fiber-reinforced wheat gluten biocomposites) are disclosed. For example, systems/methods for fabricating particleboard from lignocellulosic materials (e.g., coconut materials), along with a binder material (e.g., wheat gluten), are provided. In general, the fiber or lignocellulosic material is treated with sodium hydroxide and/or a silane coupling agent as an adhesion promoter to enhance interfacial adhesion between the fiber and the binder. For example, (3-triethoxysilylpropyl)-t-butylcarbamate (MISO) (a masked isocyanate functional silane) was utilized to improve interfacial adhesion between the binder and the natural fibers.

30 Claims, 24 Drawing Sheets

(56) References Cited

OTHER PUBLICATIONS

Viswanathan et al., Water Absorption and Swelling Characteristics of Coir Pith Particle, Bioresour. Technol. 71(1), 93-94, 2000.
Mo, X. et al., Compression And Tensile Strength Of Low Density Straw-Protein Particleboard, Ind. Crops Prod., 14, 1-9, 2001.
Mohanty et al., Surface Modifications Of Natural Fibers And Performance Of The Resulting Biocomposites: An Overview, Composite Interfaces, 8(5), 313-343, 2001.
Rout et al., The Influence Of Fiber Surface Modification On The Mechanical Properties Of Coir-Polyester Composites, Polymer Composites, 22(4), 468-476, 2001.
Rout et al., The Influence Of Fibre Treatment On The Performance Of Coir-Polyester Composites, Composites Science and Tech., 61 1303-1310, 2001.
Abdul Khalil et al., Effect Of Acetylation And Coupling Agent Treatments Upon Biological Degradation Of Plant Fiber Reinforced Polyester Composites, Polymer Testing, 20(1) 65-75, 2001.
Rout et al., Novel Eco-Friendly Biodegradable Coir-Polyester Amide Biocomposites, Polymer Composites, 22(6), 770-778, 2001.
Wang et al., Low Density Particleboard From Wheat Straw And Corn Pith, Ind. Crops Prod., 15, 43-50, 2002.
Zhong et al., Wet Strength And Water Resistance Of Modified Soy Protein Adhesives And Effects Of Drying Treatment, Journal of Polymers and the Environment, vol. 11, 137-144, 2003.
Pommet et al., Study Of Wheat Gluten Plasticization With Fatty Acids, Polymer, 44, 115-122, 2003.
Khedari et al., New Insulating Particleboards Form Durian Peel and Coconut Coir, Building and Environment, 38(3), 435-441, 2003.
Mishra et al., Studies on Mechanical Performance of Biofibre/Glass Reinforced Polyester Hybrid Composites, Composites Science Technology, 63, 1377-1385, 2003.
Van Dam et al., Process for Production of High Density/High Performance Binderless Boards From Whole Coconut Husk Park 1: Lignin as Intrinsic Thermosetting Binder Resin; Industrial Crops Products, 19(3), 207-216, 2004.
Van Dam et al., Production Process for High Density High Performance Binderless Boards from Whole Coconut Husk, Industrial Crops and Products, 20(1), 97-101, 2004.
Silva et al., Fracture Toughness of Natural Fibers/Castor Oil Polyurethane Composites, Composites Science and Technology, 66(10), 1328-35, 2006.
Van Dam et al., Process for Production of High Density/High Performance Binderless Boards from Whole Coconut Husk—Part 2: Coconut Husk Morphology, Composition and Properties, Industrial Crops and Products, 24(2), 96-104, 2006.
Ye et al., Manufacture and Biodegradation of Wheat Gluten/Basalt Composite Material, Journal of Polymers and the Environment, vol. 14, No. 1, 1-7, 2006.
Arkies, B., Silane Coupling Agents: Connecting Across Boundaries, V2.0, Gelest, Inc., Morrisville, PA, p. 16, 2006.
El-Wakil et al., Modified Wheat Gluten As A Binder In Particleboard Made From Reed, Journal of Applied Polymer Science, 106(6), 3592-3599, 2007.
Leiva et al., Medium-Density Particleboards From Rice Husks And Soybean Protein Concentrate, Journal of Applied Polymer Science, 106, 1301-1306, 2007.
Rahman et al., Surface Treatment Of Coir Fibers And Its Influence On The Fibers PhysicoMechanical Properties, Composites Science and Technology, 67(11-12), 2369-2376, 2007.
Li et al., Chemical Treatments of Natural Fiber for Use in natural Fiber-Reinforced Composites: A Review, Journal of Polymers and the Environment, 15, 25-33, 2007.
Kunanopparat, et al., Reinforcement of Plasticized Wheat Gluten With Natural Fibers: From Mechanical Improvement to Deplasticizing Effect, Science Direct, Composites: Part A, 39, 777-785, 2008.
Kunanopparat et al., Plasticized Wheat Gluten Reinforcement With Natural Fibers: Effect Of Thermal Treatment On The Fiber/Matrix Adhesion, Composites: Part A, 39, 1787-1792, 2008.
Jústiz-Smith et al., Potential of Jamaican Banana, Coconut Coir and Bagasse Fibres as Composite Materials, Materials Characterization, 59, 1273-1278, 2008.
Avella et al., Eco-Challenges of Bio-Based Polymer Composites, Materials, 2, 911-925, 2009.
Hai et al., Effect of NaOH Treatments on Jute and Coir Fiber PP Composites, Advanced Composite Materials, 18(3), 197-208, 2009.
Rosa et al., Effect of Fiber Treatments on Tensile and Thermal Properties of Starch/Ethylene Vinyl Alcohol Copolymers/Coir Biocomposites, Bioresource Technology 100(21), 5196-5202, 2009.
Wei et al., Characterisation and Utilization of Natural Coconut Fibres Composites, Materials and Design, 30, 2741-2744, 2009.
Wretfors et al., Effects of Fiber Blending and Diamines on Wheat Gluten Materials Reinforced With Hemp Fiber, Journal of Polymers and the Environmen,t 17(4), 259-266, 2009.
Kalia et al., Pretreatments of Natural Fibers and Their Applications as Reinforcing Material in Polymer Composites—A Review, Polymer Engineering Science, 49, 1253-1272, 2009.
Lei, H. et al., Gluten Protein Adhesives for Wood Panels, J. of Adhesion Science and Tech., 24, 1583-1596, 2010.
Nordqvist et al., Comparing Bond Strength And Water Resistance Of Alkali-Modified Soy Protein Isolate And Wheat Gluten Adhesives, Int'l J. of Adhesion & Adhesives, 30, 72-79, 2010.
Khosravi et al., Protein-Based Adhesives For Particleboards, Industrial Crops and Products, 32, 275-283, 2010.
Ali, M., Coconut Fibre—A Versatile Material And Its Applications In Engineering, Second Int'l Conference on Sustainable Construction Materials and Technology, Main vol. 3, Paper 13, 1441-1454, 2010.
Carvalho et al., Chemical Modification Effect on the Mechanical Properties of Hips/Coconut Fiber Composites, BioResources, 5(2), 1143-55, 2010.
Javadi et al., Processing And Characterization Of Solid And Microcellular PHBV/Coir fiber Composites, Materials Science and Eng., 30(5) 749-757, 2010.
Wretfors et al., Effects Of Fiber Blending And Diamines On Wheat Gluten Materials Reinforced With Hemp Fiber, Journal of Materials Science, 45(15), 4196-4205, 2010.
Reddy et al., Biocomposites Developed Using Water-Plasticized Wheat Gluten As Matrix And Jute Fibers As Reinforcement, Polymer Int'l , 60(4), 711-716, 2011.
Muensri et al., Effect Of Lignin Removal On The Properties Of Coconut Coir Fiber/Wheat Gluten Biocomposite, Composites, Part A: Applied Science and Mfg., 42A(2), 173-179, 2011.

* cited by examiner

FTIR spectra of (a) CCF and (b) ACCF treated with about 5 wt% NaOH solution.

XPS survey spectra of ACCF and ASCCF.

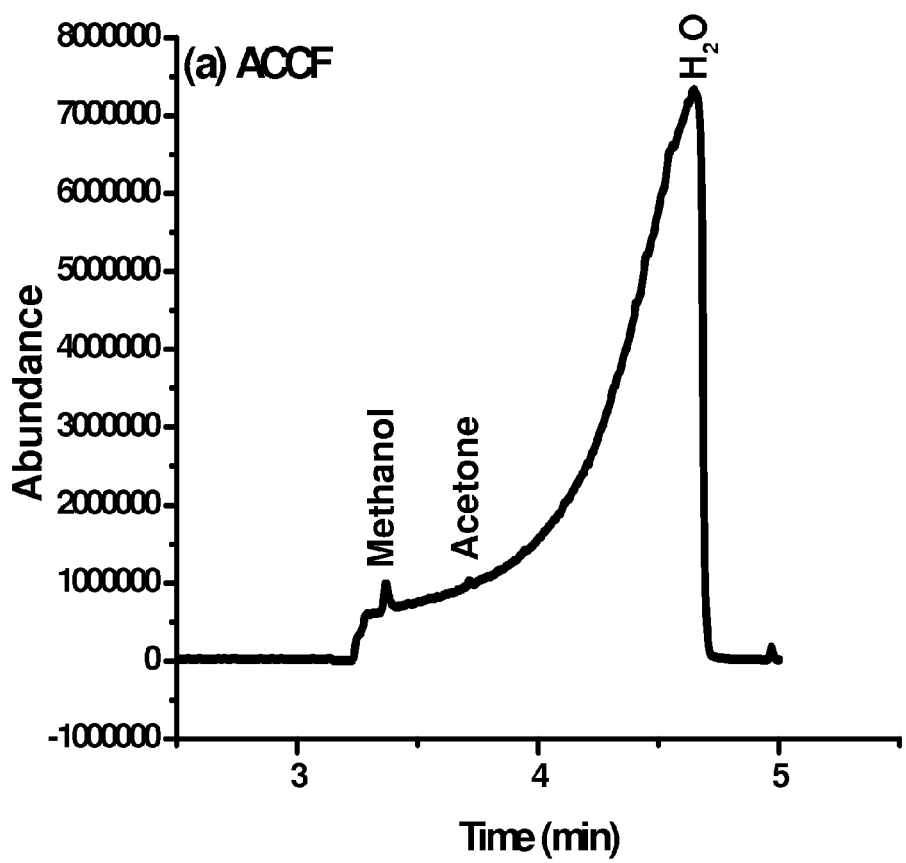
Figure 6A - Gas chromatogram of: (a) ACCF.

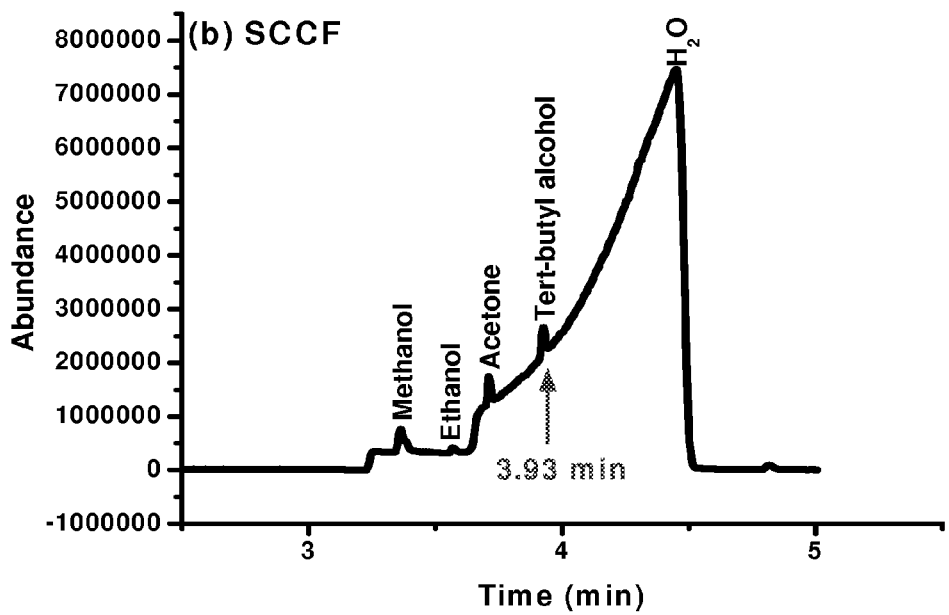
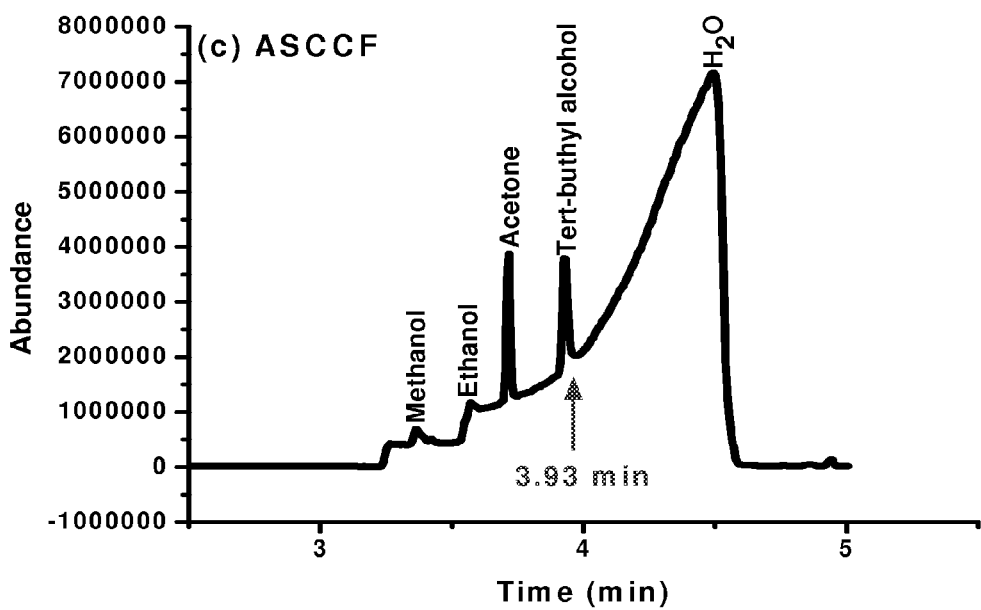
Figures 6B-C - Gas chromatograms of: (b) SCCF, and (c) ASCCF.

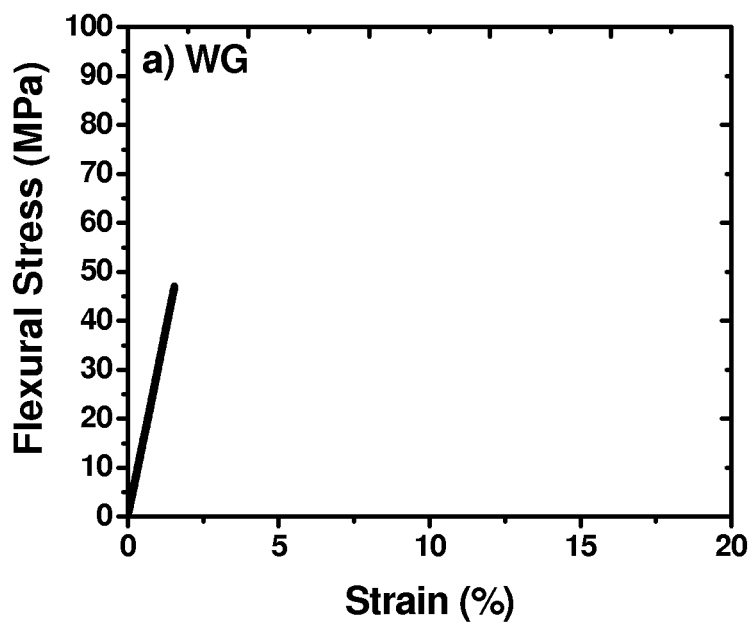
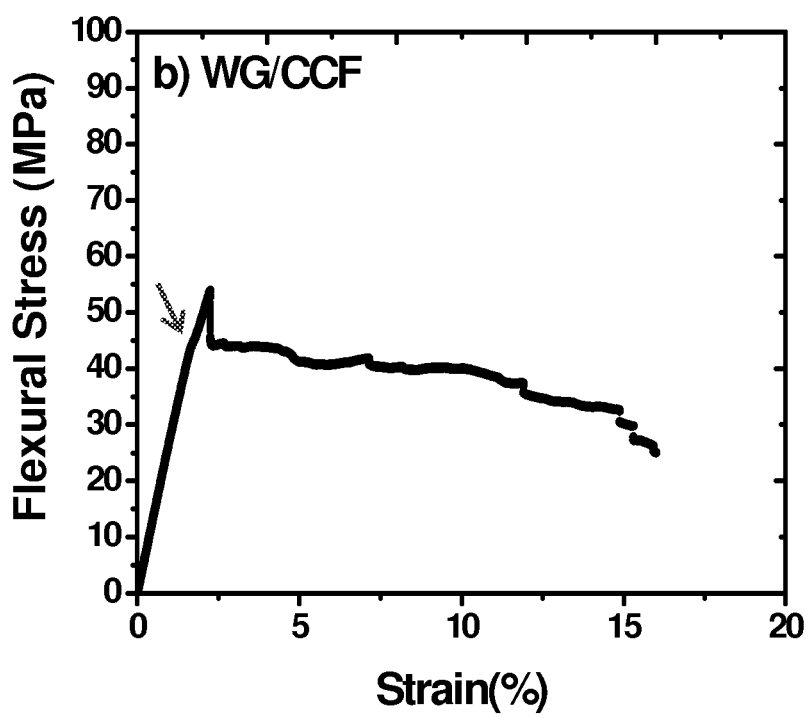
FIGURES 7A-B

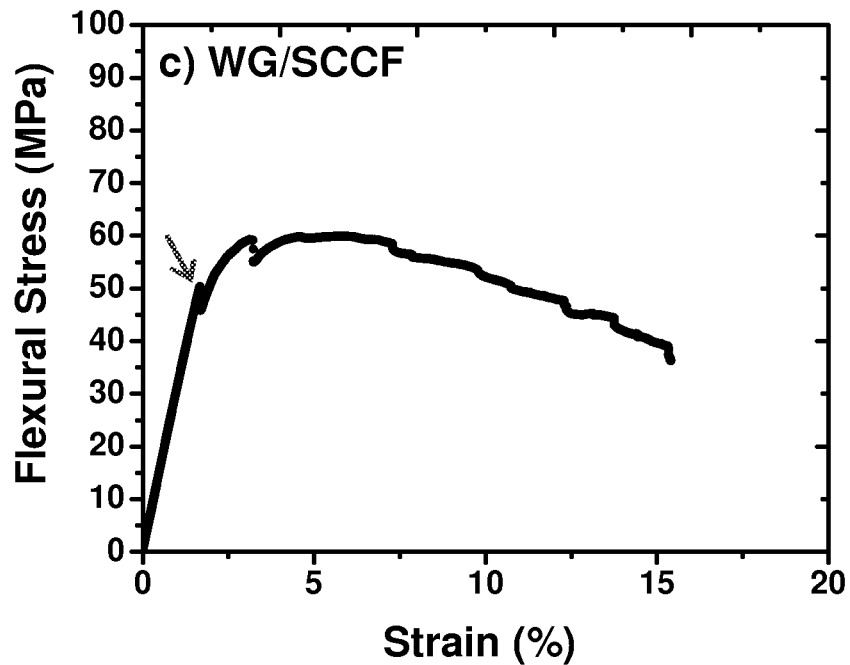
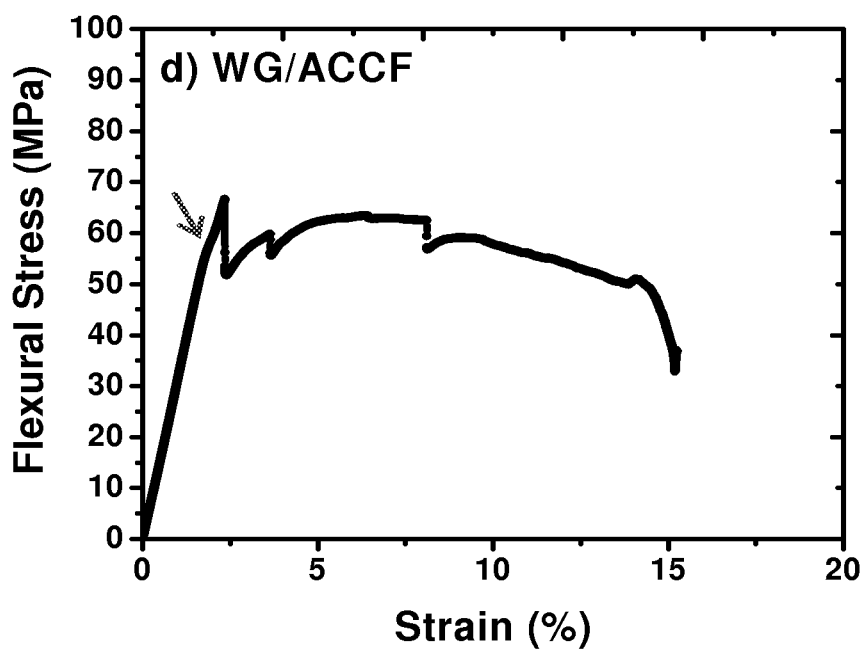
FIGURES 7C-D

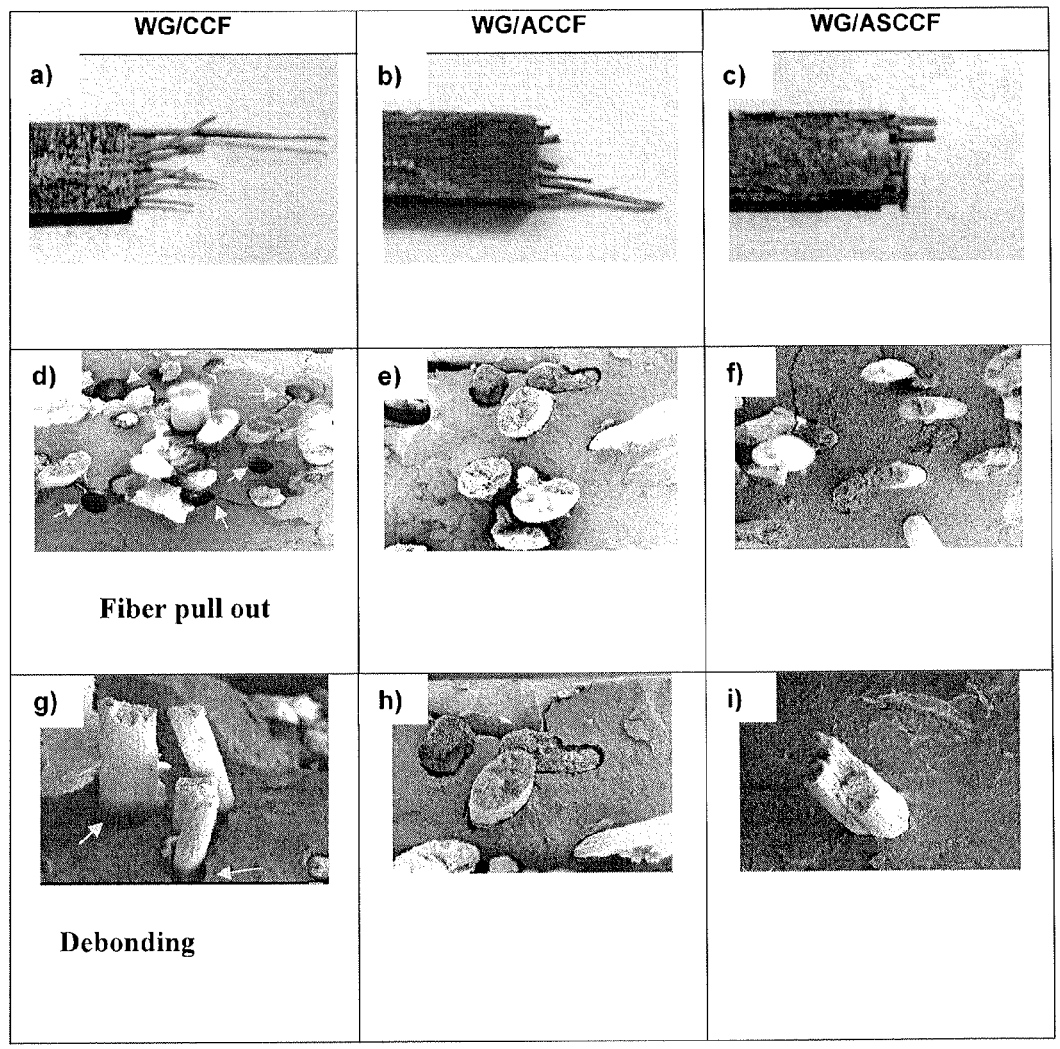
FIGURES 8A-I

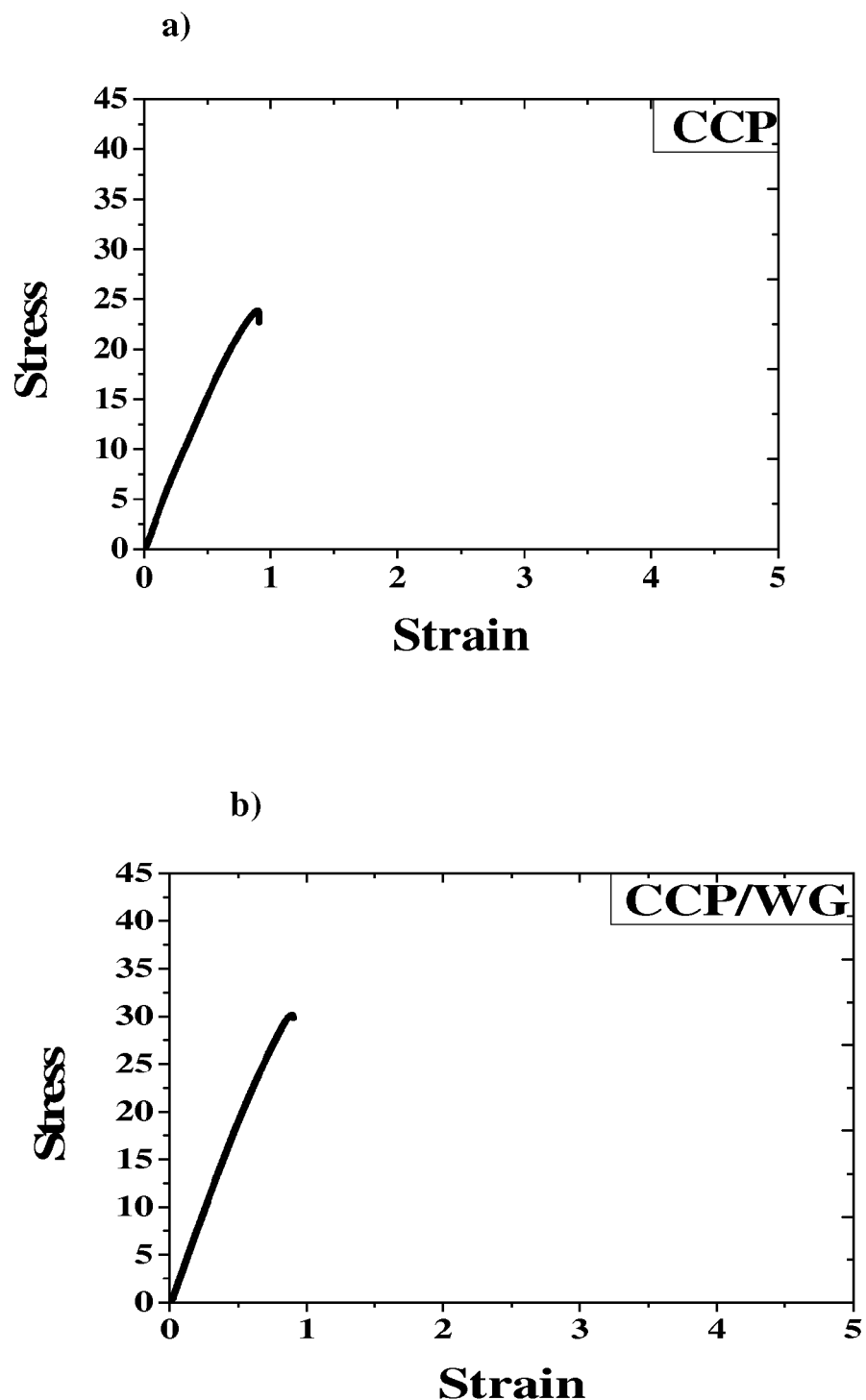
FIGURES 9A-B

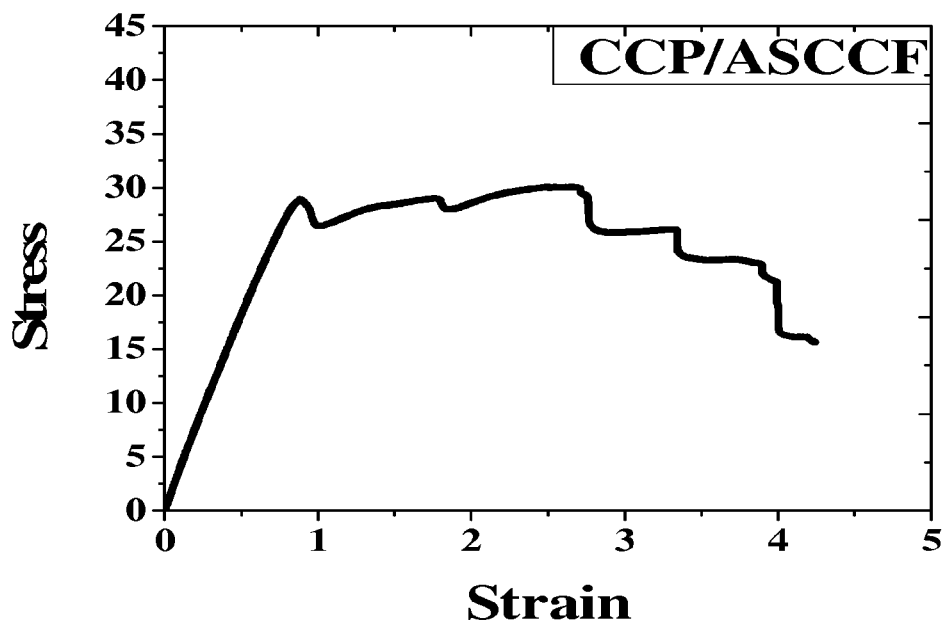
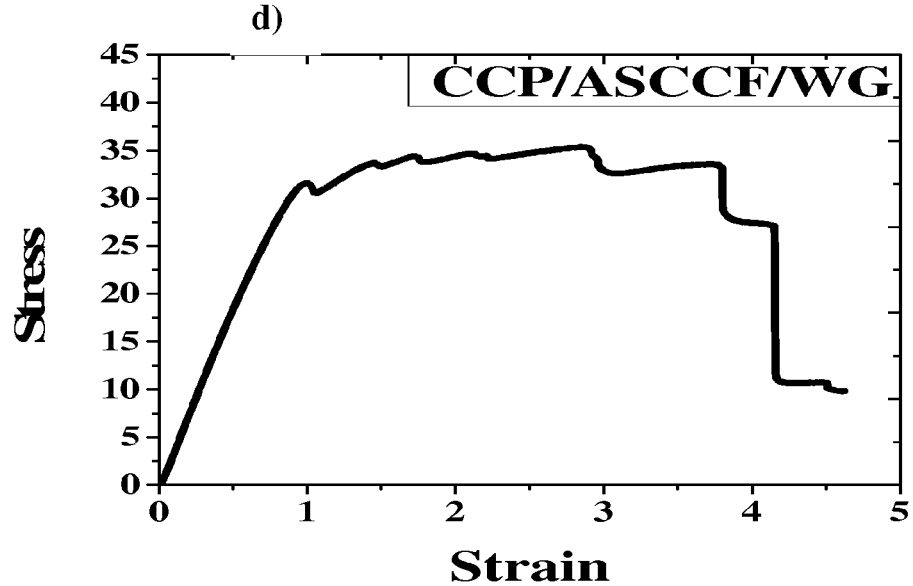
FIGURES 9C-D

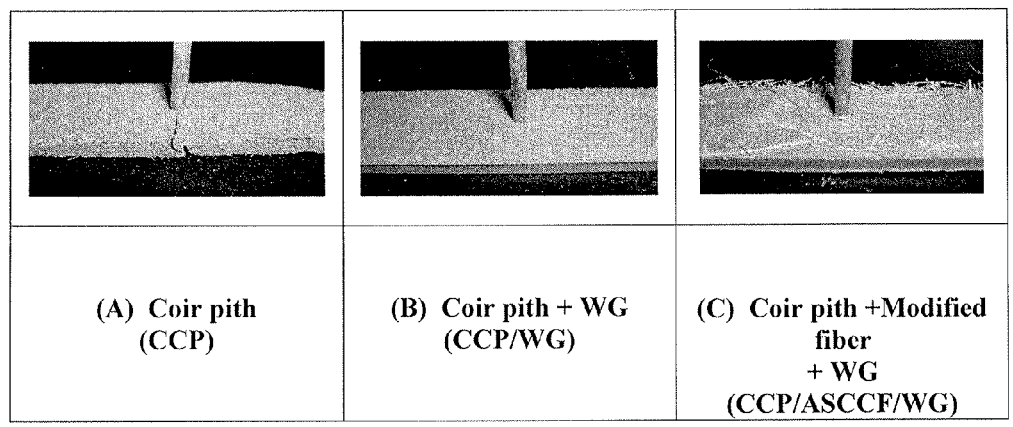
FIGURES 10A-C
Particleboard images after the nail-driving test.

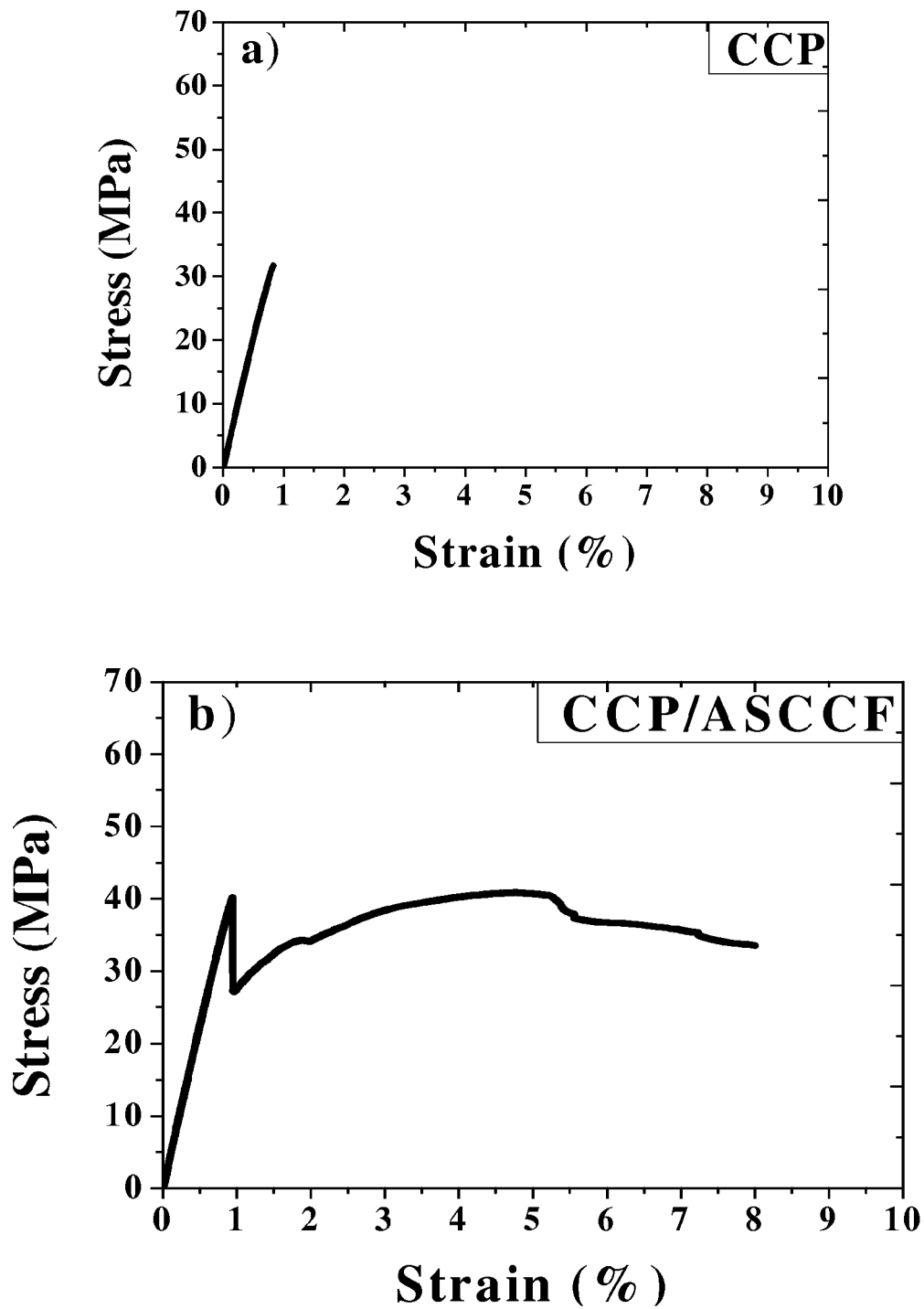
FIGURES 11A-B

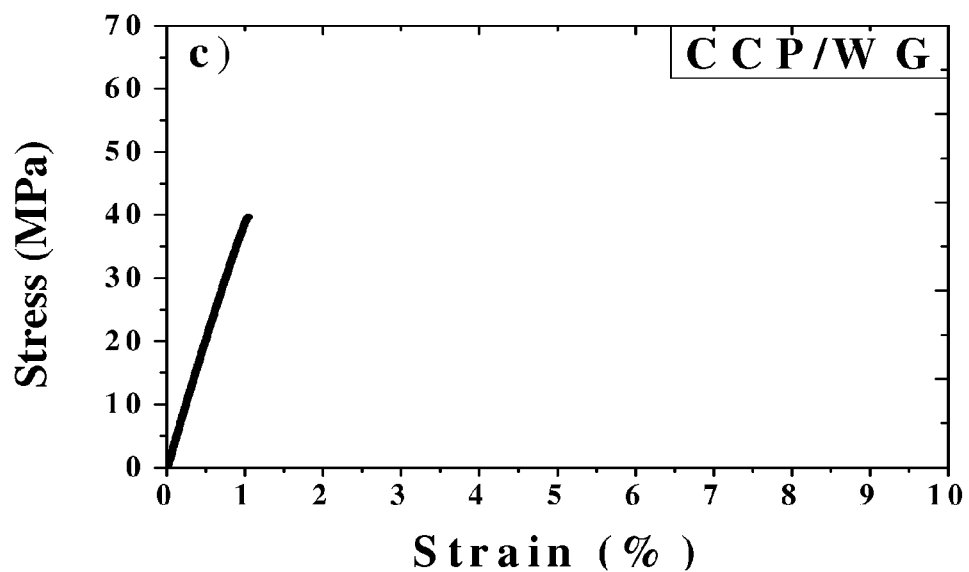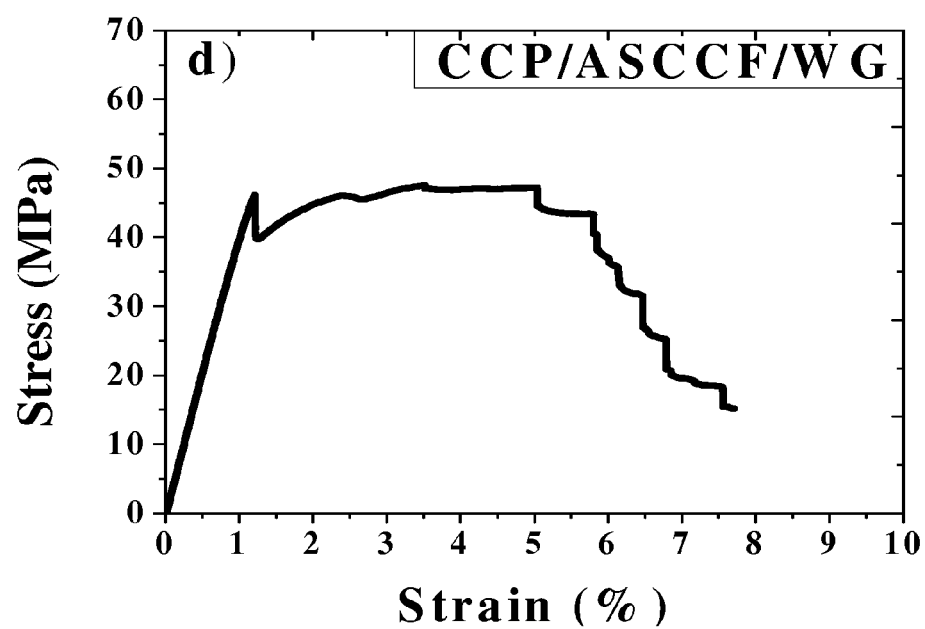
FIGURES 11C-D

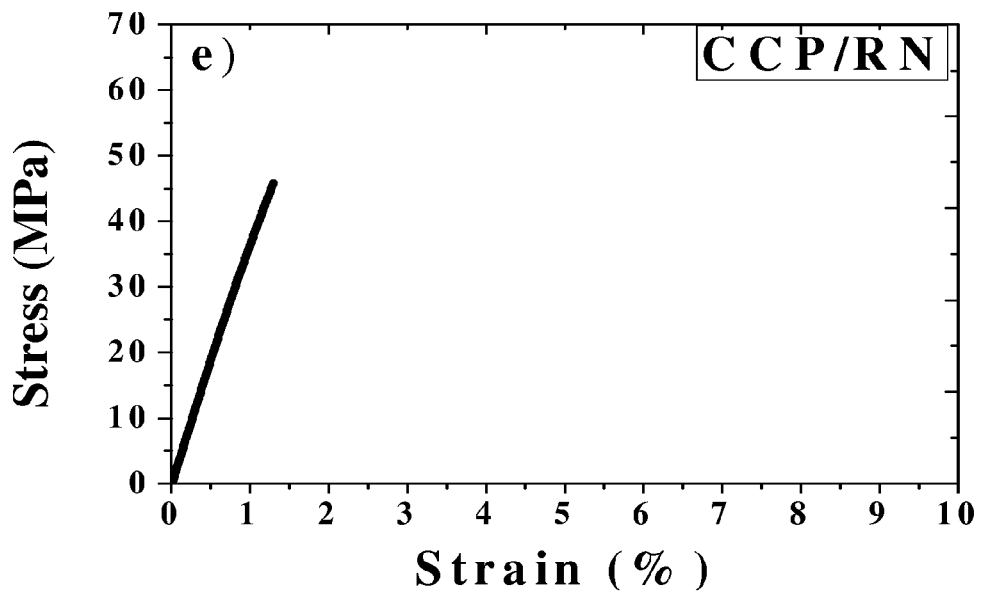
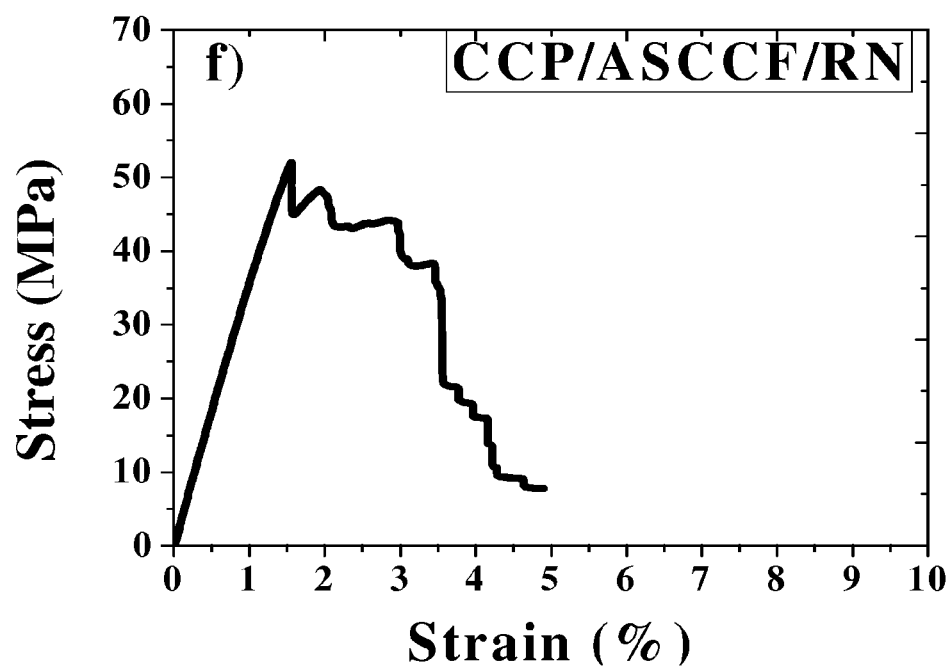
FIGURES 11E-F

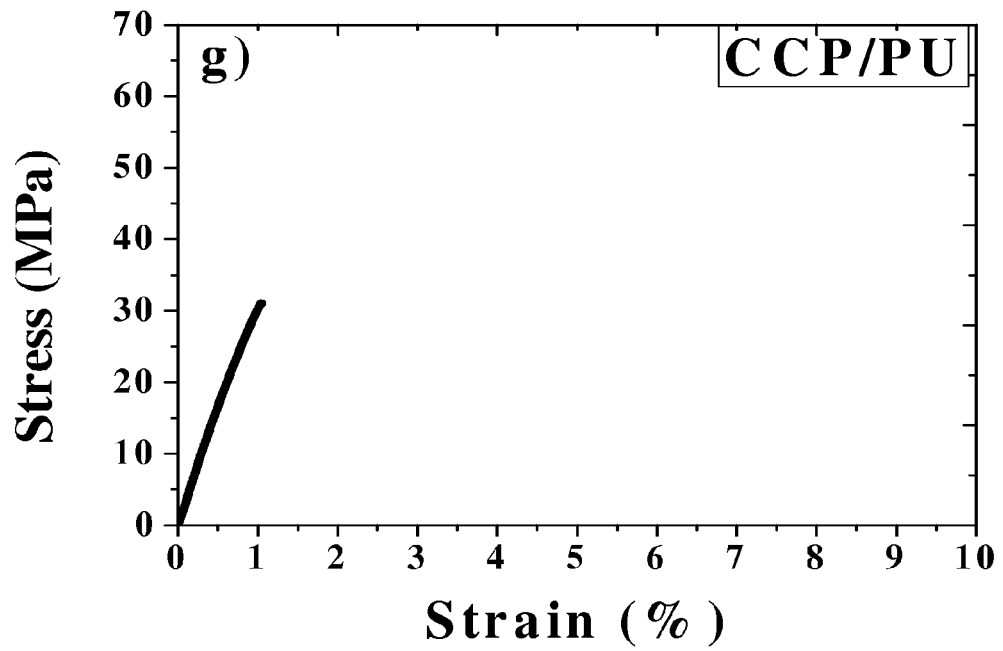
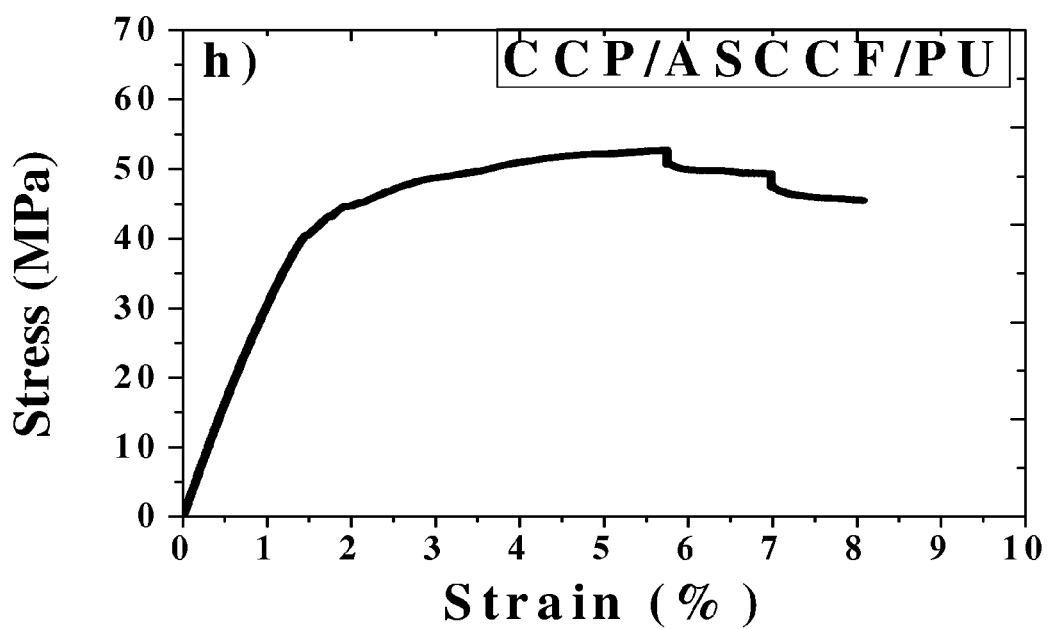
FIGURES 11G-H

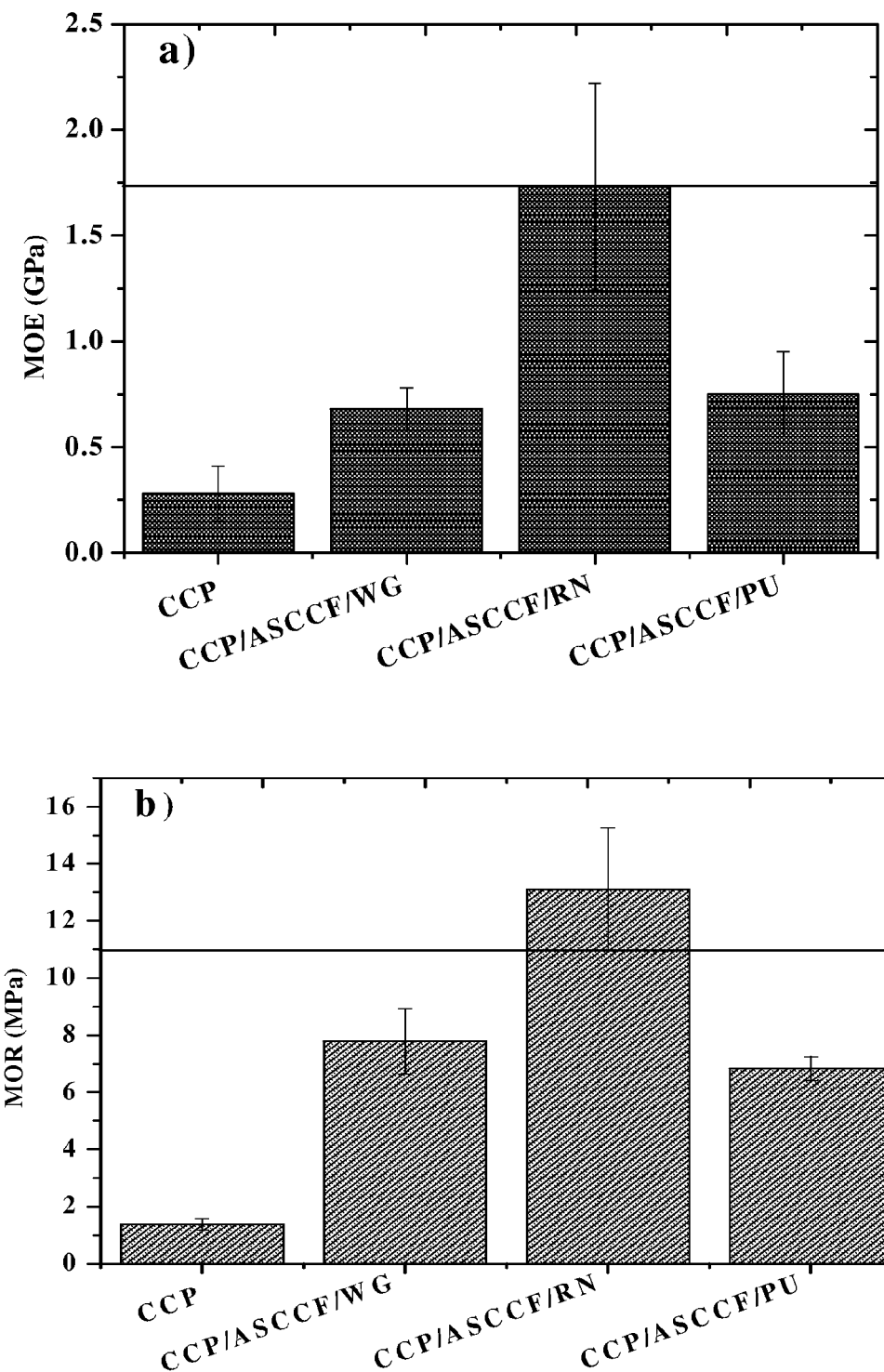
FIGURES 12A-B

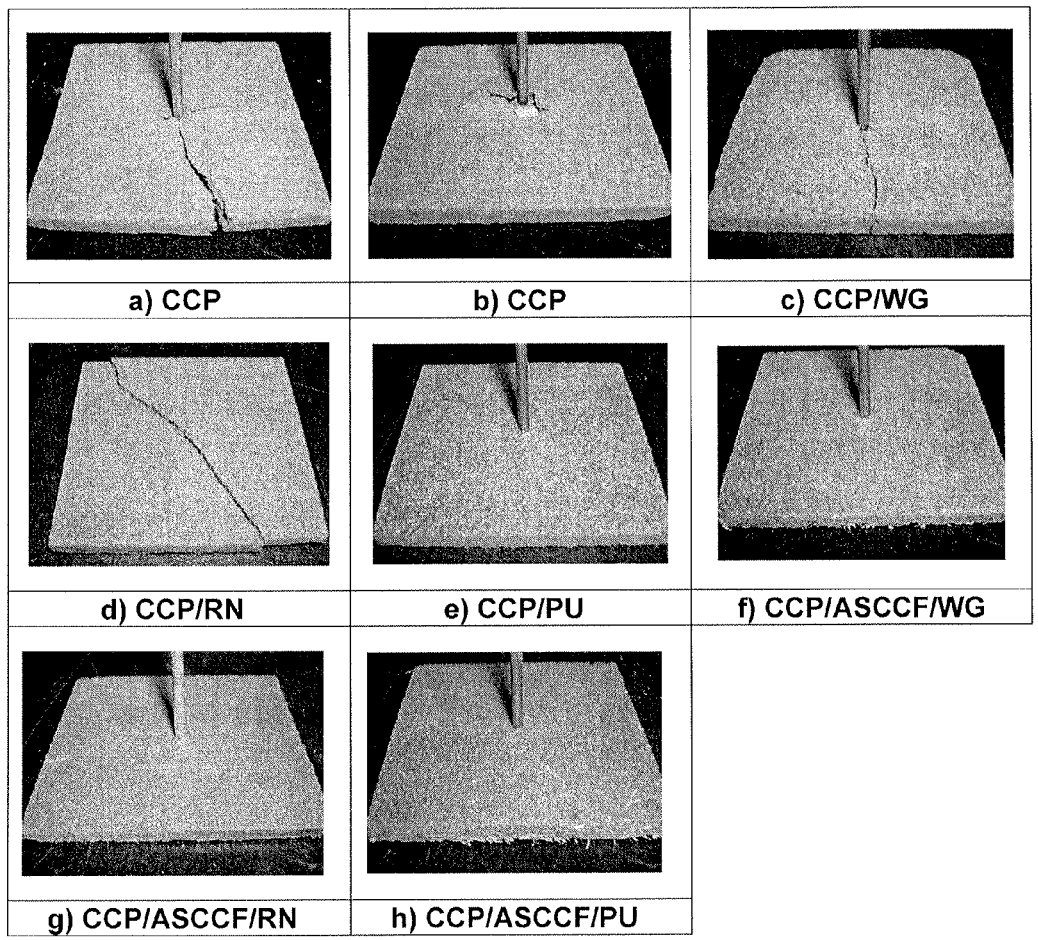
FIGURES 13A-H

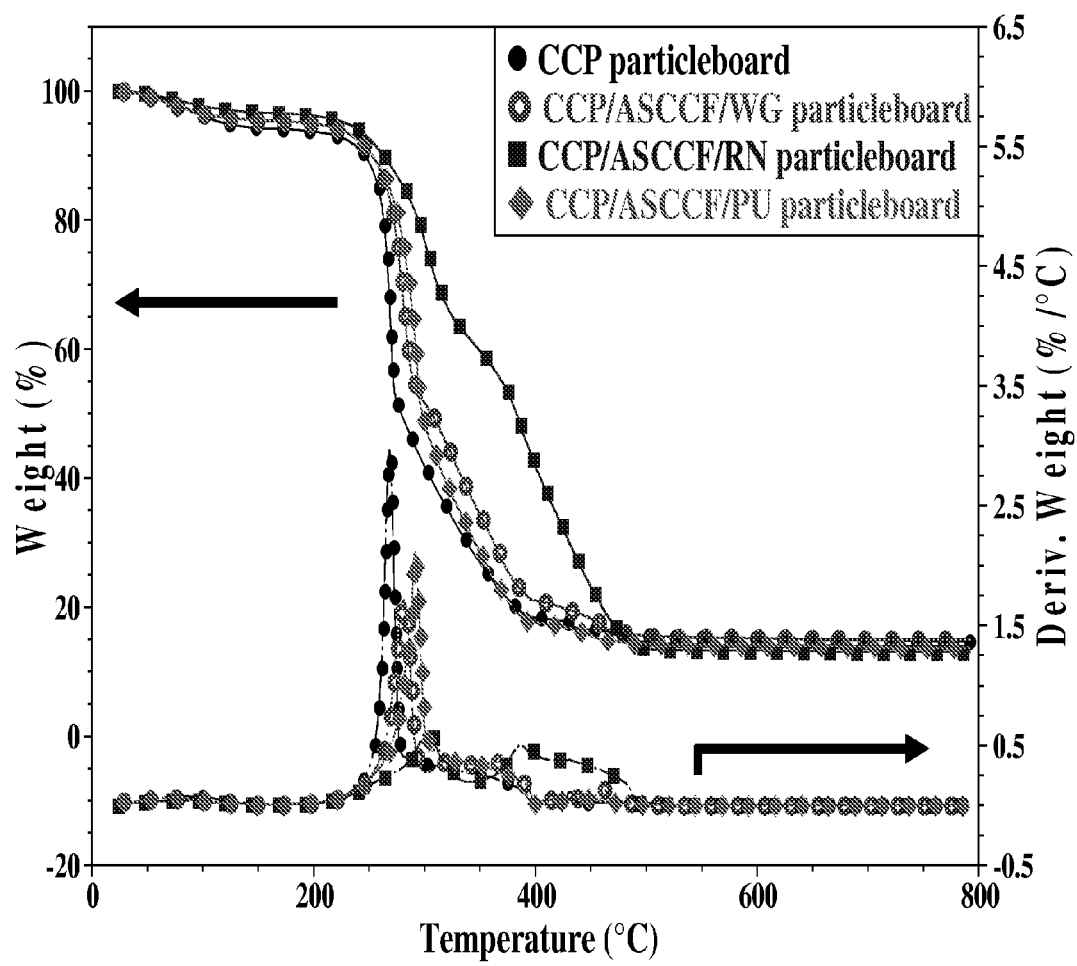
FIGURE 14 - Thermo-gravimetric analysis of exemplary particleboards

Figure 15 - Stress-Strain curve for Sample 2A (Table 16)
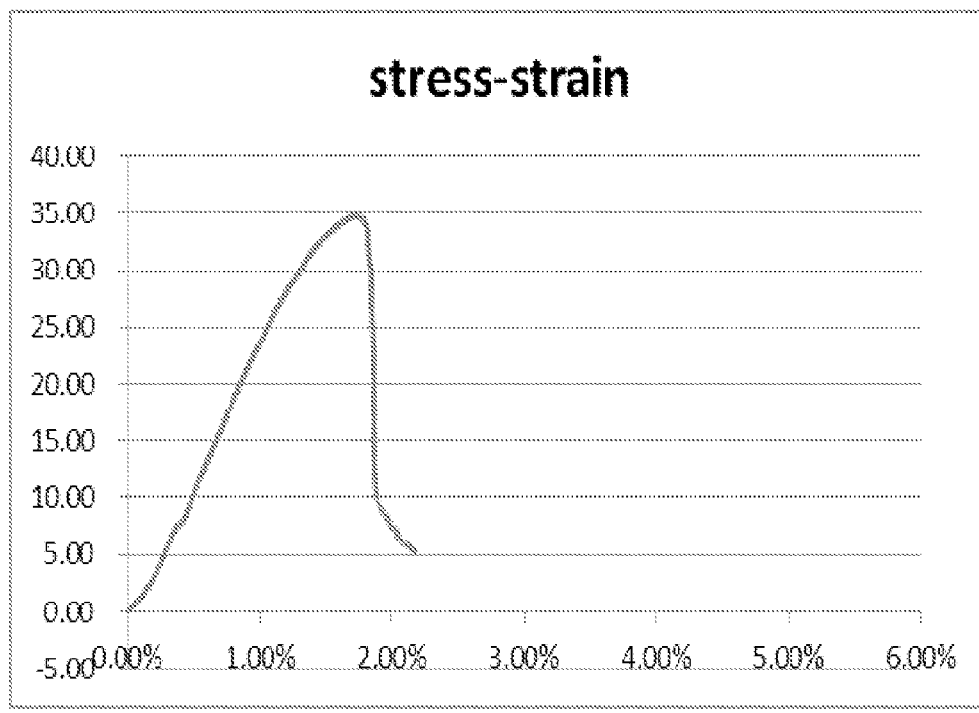

PROCESS FOR PARTICLEBOARD MANUFACTURE

CROSS-REFERENCE TO RELATED APPLICATIONS

This application claims the benefit of U.S. Provisional Application No. 61/546,615 filed Oct. 13, 2011, all of which is herein incorporated by reference in its entirety.

BACKGROUND

1. Technical Field

The present disclosure relates to particleboard and methods for fabricating particleboard (e.g., from natural fibers/materials, such as coconut-based materials) and, more particularly, to particleboard (e.g., formaldehyde-free particleboard) utilizing natural fibers/materials (e.g., lignocellulosic materials), wherein the particleboard has improved performance characteristics and/or mechanical properties.

2. Background Art

In general, particleboard is an engineered panel product manufactured from wood particles (e.g. wood chips, sawmill shavings and/or sawdust) and/or other lignocellulosic particles and fibers (e.g. hemp, kenaf, jute and/or cereal straw), which are typically pressed and bonded together using a binder (see, e.g., Wallenberger et al., *Natural fibers, plastics and composites*, Chapter 14: *Uses Of Natural Fiber Reinforced Plastics*, Kluwer Academic Pub. (2004) 249-53). It is noted that while some in the industry may generally differentiate some classes of bonded boards such as, for example, particleboard, fiber-board and others, the term particleboard is used in the present disclosure to include the products (e.g., particleboard, bonded-board, fiber-board, etc.) that may be fabricated utilizing the systems and methods of the present disclosure, as described below.

Particleboard is often used for indoor products including cupboards, built-in furniture, and shelving, as well as for many other construction applications or the like. In general, urea-formaldehyde (UF) and phenol-formaldehyde (PF) resins are typical binders used by the particleboard industry due to a variety of reasons (e.g., low cost, ease of use, a variety of curing conditions, low cure temperature, short curing time, water solubility, resistance to microorganisms and to abrasion, thermal properties, strength and water resistance) (see, e.g., El-Wakil et al., *Modified Wheat Gluten As A Binder In Particleboard Made From Reed*, Journal of Applied Polymer Science, (2007) 106(6), 3592-99; and Maloney, T. M., *The Family Of Wood Composite Materials*, Forest Products Journal (1996) 46(2), 19-26).

However, UF and PF resins are generally neither eco-friendly nor safe due to health effects of exposure to formaldehyde emissions (see, e.g., Marutzky, R., *Release Of Formaldehyde By Wood Products*, Wood Adhesives—Chemistry And Technology, Marcel Dekker, Inc., (1989) 307-87; Henderson, J. T., *Volatile Emissions From The Curing Of Phenolic Resins*, TAPPI Journal (1979) 62(8), 93-96; Meyer et al., *Formaldehyde Release From Wood Products: An Overview*, ACS symposium series 316: Formaldehyde Release From Wood Products, (1986), 1-16; Groah, W. J., *Formaldehyde Emissions: Hardwood Plywood And Certain Wood Based Panel Products*, ACS symposium series 316: Formaldehyde release from wood products, (1986) 12-26; Baumann, M. G. D., *Aldehyde Emission From Particleboard And Medium Density Fiberboard Products*, Forest Products Journal, (2000) 50(9), 75-82; Mo, X. et al., *Compression And Tensile Strength Of Low Density Straw-Protein Particleboard*, Ind. Crops Prod. (2001) 14, 1-9).

Moreover, formaldehyde-based adhesives are derived from generally unsustainable petrochemicals. Therefore, formaldehyde-free adhesives from renewable resources have been developed for the wood composites industry. In general, natural adhesives based on proteins such as soy protein, wheat gluten, and milk casein are an attractive alternative for an environmentally friendly binder for particleboard production (see, e.g., Lei, H. et al., *Gluten Protein Adhesives For Wood Panels*, J. of Adhesion Science and Tech. (2010), 24, 1583-1596; Nordqvist et al., *Comparing Bond Strength And Water Resistance Of Alkali-Modified Soy Protein Isolate And Wheat Gluten Adhesives*, Int'l J. of Adhesion & Adhesives (2010) 30, 72-79; Khosravi et al., *Protein-Based Adhesives For Particleboards*, Industrial Crops and Products (2010) 32, 275-83; Sun et al., *Bio-Based Polymers And Composites*, Elsevier Inc., (2005) 292-368; Hettiarachchy et al., *Alkali-Modified Soy Protein With Improved Adhesive And Hydrophobic Properties*, J. Am. Oil Chem. Soc. (1995) 72, 1461-64; Wang et al., *Low Density Particleboard From Wheat Straw And Corn Pith*, Ind. Crops Prod. (2002) 15, 43-50; Zhong et al., *Wet Strength And Water Resistance Of Modified Soy Protein Adhesives And Effects Of Drying Treatment*, J. Polym. Environ. (2003) 11, 137-44; Leiva et al., *Medium-Density Particleboards From Rice Husks And Soybean Protein Concentrate*, J. Appl. Polym. Sci. (2007) 106, 1301-06).

In general, wheat gluten (WG) is a complex protein derived from wheat, and has been investigated for potential use in food and non-food applications. In the last decades, environmental concerns about an increase in non-degradable plastic waste have generated interest in biopolymers from renewable natural sources. WG-based plastics can potentially be used to substitute conventional petroleum-based plastics due to their non-toxicity, large-scale availability, low cost, biodegradability, and environmentally friendly properties (see, e.g., Bietz et al., *Properties And Non-Food Potential Of Gluten*, Cereal Foods World (1996) 41, 376-82).

However, some of the plastics made from WG are brittle, and generally absorb water after being processed. Some approaches to improve the mechanical properties and water resistance of WG have been developed. For example, the addition of additives such as synthetic and natural fibers to reinforce WG is one approach to tailor the mechanical properties of WG plastics. Some advantages of natural fibers over traditional reinforcing and man-made fibers (e.g. glass, carbon, aluminum oxide and Kevlar) are their low cost, low density, good specific mechanical properties, high toughness, non-abrasive behavior during processing, enhanced energy recovery, and biodegradability (see, e.g., Avella et al., *Eco-Challenges of Bio-Based Polymer Composites*, Materials (2009) 2, 911-25).

In general, these advantages make the natural fibers a potential replacement for the conventional reinforcement materials in composites. However, some of the potential drawbacks of the natural fibers in the composites are incompatibility with many hydrophobic polymer matrices, and relatively high moisture absorption (see, e.g., Saheb et al., *Natural Fiber Polymer Composites: A Review*, Advances in Polymer Tech. (1999) 18(4), 351-63). Therefore, some chemical surface treatments have been considered to modify the fiber surface properties, typically resulting in improved fiber-matrix adhesion. Some of these chemical treatments include de-waxing, alkali treatment, peroxide treatment, acetylation, acrylation, benzoylation, treatment with various coupling agents, and others (see, e.g., Mohanty et al., *Surface*

Modifications Of Natural Fibers And Performance Of The Resulting Biocomposites: An Overview, Composite Interfaces (2001) 8(5), 313-43).

In general, the thiol groups (—SH) of cysteine in the WG protein play a role in adhesion. At a high temperature, a thiol/disulfide interchange reaction typically occurs, thus cross-linking the protein to form a three dimensional network (see, e.g., Schofield et al., *The Effect Of Heat On Wheat Gluten And The Involvement Of Sulphydryl-Disulphide Interchange Reactions*, J. Cereal Sci. (1983) 1, 241-53; Fernandes et al., *Theoretical Insights Into The Mechanism For Thiol/Disulfide Exchange*, Chem. Eur. J. (2004) 10, 257-66; Pommet et al., *Study Of Wheat Gluten Plasticization With Fatty Acids*, Polymer (2003) 44, 115-22).

Thus, during particleboard preparation by hot-press molding, the cross-linking reaction of WG typically occurs. In general, during hot-press molding, some phenolic hydroxyl groups of lignin in wood particles or lignocellulosic materials are oxidized to form quinines. The thiol groups in WG can then react with the quinines through the Michael addition reaction, typically resulting in adhesion between wood particles or lignocellulosic materials and the WG adhesives (see, e.g., Takasaki et al., *Formation Of Protein-Bound 3,4-Dihydroxyphenylalanine And 5-S-Cysteinyl-3,4-Dihy-Droxyphenylalanine As New Cross-Linkers In Gluten*, J. Agric. Food Chem. (1997) 45, 3472).

In general, coconut fiber and coconut coir pith (coco peat) are derived from coconut husks. Coconut fiber (CCF) is lignocellulosic fiber typically extracted from the husk of coconut fruit obtained from coconut palm trees (*Cocos nucifera*), which are abundantly available in tropical countries. The coconut pith is the particulate generally obtained after long fibers are removed from the coconut husk. Coconut fiber can be used to make, for example, rope, yarn, floor mats, mattresses and brushes, while the pith material is typically manufactured into industrial adsorbents, composting material or plant growing systems. However, a small percentage of the coconut fiber and coconut pith is consumed for conventional uses, and much of it still remains unused.

In general, CCF possesses many advantages. For example, it is inexpensive, moth-proof, generally resistant to fungi and rot, not easily combustible, flame-retardant, it provides excellent insulation against temperature and sound, and it is amenable to chemical modification. Moreover, CCF is tough and durable. In general, it is the most ductile fiber amongst the natural fibers, capable of taking about 4-6 times more elongation than other fibers (see, e.g., Ali, M., *Coconut Fibre—A Versatile Material And Its Applications In Engineering*, Second Int'l Conference on Sustainable Construction Materials and Tech. (2010) Main Vol. 3, Paper 13, 1441-54).

CCF has been used as reinforcement in order to modify the properties of many polymers, such as polyester, polyester amide, polyacrylate, polypropylene, linear low density polyethylene (LLDPE), high impact polystyrene (HIPS), polyurethane, poly-3-hydroxy butyrate co-valerate (PHBV), starch/ethylene vinyl alcohol copolymers blend, and natural rubber.

5. See, e.g., Rout et al., *The Influence Of Fiber Surface Modification On The Mechanical Properties Of Coir-Polyester Composites*, Polymer Composites (2001) 22(4), 468-76; Rout et al., *The Influence Of Fibre Treatment On The Performance Of Coir-Polyester Composites*, Composites Science and Tech. (2001) 61 1303-10; Hill et al., *Effect Of Fiber Treatments On Mechanical Properties Of Coir Or Oil Palm Fiber Reinforced Polyester Composites*, J. of Applied Polymer Science (2000) 78(9), 1685-97; Hill et al., *The Effect Of Environmental Exposure Upon The Mechanical Properties Of Coir Or Oil Palm Fiber Reinforced Composites*, J. of Applied Polymer Science (2000) 77(6), 1322-30; Varma et al., Coir Fibers, J. of Reinforced Plastics and Composites (1985) 4(4), 419-29; Abdul Khalil et al., *Effect Of Acetylation And Coupling Agent Treatments Upon Biological Degradation Of Plant Fiber Reinforced Polyester Composites*, Polymer Testing (2001) 20(1) 65-75; Prasad et al., *Alkali Treatment Of Coir-Polyester Composites*, J. of Materials Science (1983) 18(5), 1443-54; Rout et al., *Novel Eco-Friendly Biodegradable Coir-Polyester Amide Biocomposites*, Polymer Composites (2001) 22(6), 770-78; Rahman et al., *Surface Treatment Of Coir Fibers And Its Influence On The Fibers Physico-Mechanical Properties*, Composites Science and Tech. (2007) 67(11-12), 2369-76; Rozman et al., *The Effect Of Lignin As A Compatibilizer On The Physical Properties Of Coconut Fiber-Polypropylene Composites*, Eur. Polym. J. (2000) 36(7), 1483-94; Hai et al., Advanced Composite Materials, (2009) 18(3), 197-208; Tan et al., Advanced Materials Research (2010) 139-141, 348-51; Carvalho et al., BioResources (2010) 5(2), 1143-55; Silva et al., Composites Science and Technology (2006) 66(10), 1328-35; Javadi et al., *Processing And Characterization Of Solid And Microcellular PHBV/Coir fiber Composites*, Materials Science and Eng. (2010) 30(5) 749-57; Rosa et al., Bioresource Technology (2009) 100(21), 5196-5202; Geethamma et al., J. of Applied Polymer Science (1995) 55(4), 583-94; Geethamma et al., Polymer (1998) 39(6-7), 1483-91; Wei et al., *Characterisation And Utilization Of Natural Coconut Fibres Composites*, Materials and Design (2009) 30, 2741-44. Moreover, some studies have been reported on WG-based composites filled with natural fibers, such as, for example, hemp, jute, and coconut fiber (see, e.g., Kunanopparat et al., *Plasticized Wheat Gluten Reinforcement With Natural Fibers: Effect Of Thermal Treatment On The Fiber/Matrix Adhesion*, Composites: Part A (2008) 39, 777-85 and 1787-1792; Wretfors et al., *Effects Of Fiber Blending And Diamines On Wheat Gluten Materials Reinforced With Hemp Fiber*, J. of Materials Science (2010) 45(15), 4196-4205; Wretfors et al., J. of Polymers and the Environment (2009) 17(4), 259-66; Reddy et al., *Biocomposites Developed Using Water-Plasticized Wheat Gluten As Matrix And Jute Fibers As Reinforcement*, Polymer Int'l (2011) 60(4), 711-16; Muensri et al., *Effect Of Lignin Removal On The Properties Of Coconut Coir Fiber/Wheat Gluten Biocomposite*, Composites, Part A: Applied Science and Mfg. (2011) 42A(2), 173-79).

Some studies have been reported on the preparation of particleboard based on coconut materials. For example, high density particleboards from whole coconut husk have been produced without the addition of chemical binders (see, e.g., Van Dam et al., *Ind. Crops Prod.* 2004, 19(3), 207-216; Van Dam et al., *Ind. Crops Prod.* 2004, 20(1), 97-101; and Van Dam et al., *Ind. Crops Prod.* 2006, 24(2), 96-104). Moreover, CCP has been used for manufacturing particleboards using UF and PF as binders (see, e.g., Sampathrajan et al., *Bioresour. Technol.* 1992, 40(3), 249-251; Viswanathan et al., *Bioresour. Technol.* 1998, 67(1), 93-95; and Viswanathan et al., *Bioresour. Technol.* 2000, 71(1), 93-94). Additionally, insulating particleboards made from CCF with UF, PF and isocyanate binders have been reported (see, e.g., Khedari et al., *Build. Envi.* 2003, 38(3), 435-441). As noted above, there have also been some studies reporting on using modified WG as a binder for wood particleboards and fiberboards.

Thus, an interest exists for improved systems and methods for the production or fabrication of particleboard using non-formaldehyde-based binders. Stated another way, an interest exists for the design of improved formaldehyde-free particleboards. Moreover, a need remains for systems/designs for the fabrication of particleboards (e.g., formaldehyde-free particleboards) utilizing natural fibers/materials (e.g., lignocellulosic materials, such as coconut fibers and/or materials), wherein the particleboards have improved performance characteristics (e.g., mechanical properties) compared to conventional particleboards.

These and other inefficiencies and opportunities for improvement are addressed and/or overcome by the systems, assemblies and methods of the present disclosure.

SUMMARY

The present disclosure provides advantageous particleboard and methods for fabricating advantageous particleboard (e.g., natural fiber/material-based particleboard). In exemplary embodiments, the present disclosure provides for improved systems and methods for fabricating particleboard (e.g., formaldehyde-free particleboard) utilizing natural fibers/materials (e.g., lignocellulosic materials), wherein the particleboard has improved performance characteristics and/or mechanical properties.

In general, the present disclosure provides for improved systems and methods for fabricating a formaldehyde-free particleboard from fibers and/or lignocellulosic materials (e.g., coconut materials, such as coconut coir pith and/or coconut fiber), along with a binder material (e.g., wheat gluten, diphenylmethane diisocyanate, polyurethane binder based on palm oil polyol, etc.). In exemplary embodiments, the fiber or lignocellulosic material (e.g., coconut fiber) is treated with sodium hydroxide and/or a silane coupling agent as an adhesion promoter to enhance interfacial adhesion between the fiber and the coir pith, and/or between the fiber/coir pith and the binder. The mechanical and physical properties of the disclosed eco-particleboards have been examined and compared to, inter alia, the properties of a particleboard using commercial RUBINATE® binder (e.g., a water-compatible polyisocyanate based on diphenylmethane diisocyanate).

In general, fiber-reinforced biocomposites (e.g., coconut fiber-reinforced wheat gluten (WG) biocomposites) may be advantageously fabricated. For example, natural fibers (e.g., coconut fibers) may be chemically modified by sodium hydroxide and/or a silane treatment. In exemplary embodiments, (3-triethoxysilylpropyl)-t-butylcarbamate (MISO), which is a masked isocyanate functional silane, was advantageously utilized to improve interfacial adhesion between WG and the natural fibers. Moreover, X-ray photoelectron spectroscopy (XPS) and gas chromatography/mass spectroscopy (GC/MS) were employed to prove the presence of the silane on silane-treated coconut fiber (SCCF), and also to prove the presence of the silane on alkali-followed by silane-treated fiber (ASCCF). In exemplary embodiments, it has been found that ASCCF had more silane content on the fiber surface than SCCF. The mechanical properties of composites with about 15 mass % fiber loading have been assessed by three-point bending tests. Moreover, scanning electron microscopy (SEM) was used to investigate fiber pullout characteristics of composites. The WG/ASCCF composite provided about an 80% increase in strength, and showed superior fiber-matrix interfacial adhesion.

As noted, one exemplary silane utilized for the fiber treatment (e.g., fiber surface treatment) was (3-triethoxysilylpropyl)-t-butylcarbamate, which is a masked isocyanate functional silane (MISO), with demasking temperatures about 150 to about 200° C. In exemplary embodiments, the effects of surface treatments of the fibers with respect to mechanical properties of the biocomposites reinforced with the treated fibers have been investigated, as discussed further below.

The present disclosure provides for a method for fabricating a particleboard including a) soaking a portion of a lignocellulosic material in an alkali solution; b) drying the lignocellulosic material after soaking; c) soaking a portion of the lignocellulosic material in a masked isocyanate functional silane solution; d) drying the lignocellulosic material after soaking; and e) molding the lignocellulosic material.

The present disclosure also provides for a method for fabricating a particleboard wherein at least a portion of the lignocellulosic material is derived from natural fibers. The present disclosure also provides for a method for fabricating a particleboard wherein prior to step a), the lignocellulosic material is dried to a moisture content of from about 3% to about 4.5%.

The present disclosure also provides for a method for fabricating a particleboard wherein step a) is performed by soaking the lignocellulosic material in about a 5% w/v alkali solution for about 4 hours at about room temperature. The present disclosure also provides for a method for fabricating a particleboard wherein the silane solution includes (3-triethoxysilylpropyl)-t-butylcarbamate. The present disclosure also provides for a method for fabricating a particleboard wherein the silane solution is prepared by dissolving (3-triethoxysilylpropyl)-t-butylcarbamate in about a 50/50 v/v solution of water and acetone to form about 0.1 volume percent silane in the solution.

The present disclosure also provides for a method for fabricating a particleboard wherein step e) is performed by hot-press molding or compression molding the lignocellulosic material. The present disclosure also provides for a method for fabricating a particleboard wherein step e) is performed by compression molding the lignocellulosic material at from about 150° C. to about 160° C. for about 7 to 20 minutes at from about 900 $lb_f$ to about 40,000 $lb_f$.

The present disclosure also provides for a method for fabricating a particleboard wherein a binder material is added to the lignocellulosic material after step d) and prior to step e). The present disclosure also provides for a method for fabricating a particleboard wherein the binder material is selected from the group consisting of wheat gluten, diphenylmethane diisocyanate, and polyurethane.

The present disclosure also provides for a method for fabricating a particleboard wherein a coconut coir pith material is added to the lignocellulosic material after step d) and prior to step e). The present disclosure also provides for a method for fabricating a particleboard including: a) soaking a lignocellulosic material in a masked isocyanate functional silane solution; b) drying the lignocellulosic material after soaking; and c) molding the lignocellulosic material. The present disclosure also provides for a method for fabricating a particleboard wherein at least a portion of the lignocellulosic material is derived from natural fibers.

The present disclosure also provides for a method for fabricating a particleboard wherein prior to step a), the lignocellulosic material is dried to a moisture content of from about 3% to about 4.5%. The present disclosure also provides for a method for fabricating a particleboard wherein the silane solution is prepared by dissolving (3-triethoxysilylpropyl)-t-butylcarbamate in about a 50/50 v/v solution of water and acetone.

The present disclosure also provides for a method for fabricating a particleboard wherein the silane solution includes (3-triethoxysilylpropyl)-t-butylcarbamate. The present disclosure also provides for a method for fabricating a particleboard wherein step c) is performed by hot-press molding or compression molding the lignocellulosic material.

The present disclosure also provides for a method for fabricating a particleboard wherein a binder material is added to the lignocellulosic material after step b) and prior to step c).

The present disclosure also provides for a method for fabricating a particleboard wherein the binder material is selected from the group consisting of wheat gluten, diphenylmethane diisocyanate, and polyurethane. The present disclosure also provides for a method for fabricating a particleboard wherein a coconut coir pith material is added to the lignocellulosic material after step b) and prior to step c).

The present disclosure also provides for a method for fabricating a particleboard including: a) contacting a portion of a lignocellulosic material with a masked isocyanate functional silane; and b) molding the lignocellulosic material.

The present disclosure also provides for a method for fabricating a particleboard wherein at least a portion of the lignocellulosic material is derived from natural fibers.

The present disclosure also provides for a method for fabricating a particleboard wherein the masked isocyanate functional silane includes (3-triethoxysilylpropyl)-t-butylcarbamate. The present disclosure also provides for a method for fabricating a particleboard wherein before, during or after step a), a binder material is added to the lignocellulosic material prior to step b).

The present disclosure also provides for a method for fabricating a particleboard wherein the masked isocyanate functional silane is contacted with the portion of the lignocellulosic material via liquid spraying. The present disclosure also provides for a method for fabricating a particleboard wherein step a) includes mixing or blending the masked isocyanate functional silane with the portion of the lignocellulosic material.

The present disclosure also provides for a method for fabricating a particleboard wherein at least a portion of the masked isocyanate functional silane is in powder or substantially solid form. The present disclosure also provides for a method for fabricating a particleboard wherein prior to step a) at least a portion of the lignocellulosic material is soaked in an alkali solution.

The present disclosure also provides for a method for fabricating a particleboard wherein step a) further includes mixing or blending a binder material with the portion of the lignocellulosic material.

Additional advantageous features, functions and applications of the disclosed systems, assemblies and methods of the present disclosure will be apparent from the description which follows, particularly when read in conjunction with the appended figures. All references listed in this disclosure are hereby incorporated by reference in their entireties.

BRIEF DESCRIPTION OF THE DRAWINGS

Exemplary embodiments of the present disclosure are further described with reference to the appended figures. It is to be noted that the various steps, features and combinations of steps/features described below and illustrated in the figures can be arranged and organized differently to result in embodiments which are still within the spirit and scope of the present disclosure. To assist those of ordinary skill in the art in making and using the disclosed systems, assemblies and methods, reference is made to the appended figures, wherein:

FIG. 5A—gas chromatogram of MISO at a concentration of about 4.95 ppb; FIG. 5B—mass spectrum of the GC peak at retention time of about 3.93 min; and FIG. 5C—mass spectrum of tert-butyl alcohol standard;

FIGS. 6A-C depict gas chromatograms of: (a) ACCF, (b) SCCF, and (c) ASCCF;

FIGS. 7A-E depict stress-strain curves of: (a) wheat gluten (WG) composites, (b) WG/15 wt % CCF composites, (c) WG/15 wt % SCCF composites, (d) WG/15 wt % ACCF (5% NaOH treatment) composites, and (e) WG/15 wt % ASCCF (5% NaOH treatment) composites;

FIGS. 8A-I depict images showing fiber pullout characteristics of: (a) WG/CCF composites, (b) WG/ACCF composites, and (c) WG/ASCCF composites after failure under tensile test, and SEM images of tensile fractured surface of (d, g) WG/CCF composites, (e, h) WG/ACCF composites, and (f, i) WG/ASCCF composites;

FIGS. 9A-D depict stress-strain curves of: a) coconut coir pith (CCP) particleboard, b) CCP/WG (90/10) particleboard, c) CCP/ASCCF (90/10) particleboard, and d) CCP/ASCCF/WG (80/10/10) particleboard;

FIGS. 10A-C depict particleboard images after the nail-driving test;

FIGS. 11A-H depict stress-strain curves of: a) CCP, b) CCP/ASCCF (90/10), c) CCP/WG (90/10), d) CCP/ASCCF/WG (80/10/10), e) CCP/RN (90/10), f) CCP/ASCCF/RN (80/10/10), g) CCP/PU (90/10), and h) CCP/ASCCF/RU (80/10/10) small bar composites compressed at 160° C. with $8.9 \times 10^7 N/m^2$ (molding condition #2);

FIG. 12A depicts MOE, and FIG. 12B depicts MOR, for the following fabricated particleboards: (i) CCP, (ii) CCP/ASCCF/WG, (iii) CCP/ASCCF/RN, and (iv) CCP/ASCCF/PU, compared with the minimum requirement of MOE and MOR for the M–1 particleboard according to the ANSI A208.1;

FIGS. 13A-H depict particleboard images after the nail-driving test;

FIG. 14 depicts thermo-gravimetric analysis of exemplary particleboards of Example 4; and FIG. 15 depicts a stress-strain curve for an exemplary bagasse-based particleboard fabricated according to the present disclosure.

DETAILED DESCRIPTION

Figure 1:
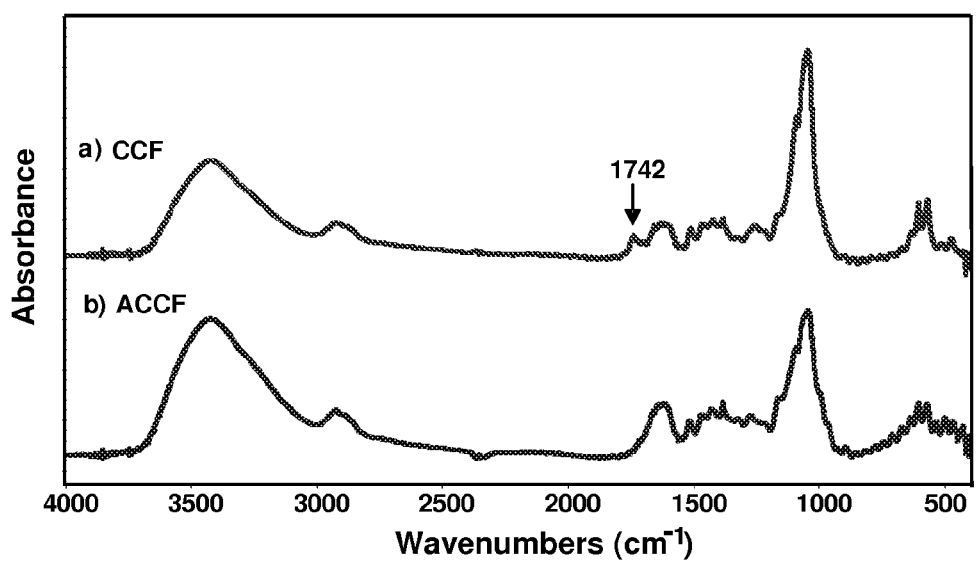
FIG. 1 depicts FTIR spectra of coconut fiber (CCF), and alkali-treated fiber (ACCF) treated with 5 wt % NaOH solution.
Figure 2:
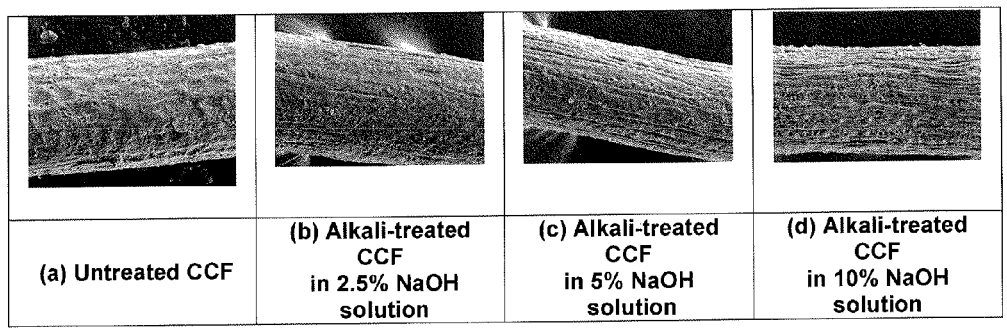
FIGS. 2A-D depict FE-SEM micrographs (300×) of: (a) untreated coconut fiber (CCF), (b) alkali-treated coconut fiber (ACCF) in about 2.5 wt % NaOH solution, (c) alkali-treated coconut fiber (ACCF) in about 5 wt % NaOH solution, and (d) alkali-treated coconut fiber (ACCF) in about 10 wt % NaOH solution.

The present disclosure provides for improved particleboard and methods for fabricating improved particleboard (e.g., natural fiber/material-based particleboard). More particularly, the present disclosure provides for systems and methods for fabricating particleboard (e.g., formaldehyde-free particleboard) utilizing natural fibers/materials (e.g., lignocellulosic materials), wherein the particleboard has improved performance characteristics and/or mechanical properties.

In general, the present disclosure provides for systems and methods for fabricating fiber-reinforced biocomposites (e.g., natural fiber-reinforced wheat gluten (WG) biocomposites). For example, the present disclosure provides systems/methods for fabricating particleboard (e.g., formaldehyde-free particleboard) from lignocellulosic materials (e.g., coconut coir pith and/or coconut fiber), along with a binder material (e.g., wheat gluten, methyl diisocyante, a polyurethane binder, etc.).

In general, the fiber or lignocellulosic material (e.g., coconut fiber/coir pith) is treated with sodium hydroxide and/or a silane coupling agent as an adhesion promoter to enhance interfacial adhesion between the fiber and the coir pith, and/or between the fiber/material and the binder. In certain embodiments, the present disclosure provides a process for producing particleboard from coconut coir pith where coconut fiber is used as a reinforcement, and wheat gluten and/or methyl diisocyante is used as a binder.

In exemplary embodiments, (3-triethoxysilylpropyl)-t-butylcarbamate (MISO), which is a masked isocyanate functional silane, may be advantageously utilized to improve interfacial adhesion between the binder (e.g., WG) and the natural fibers/materials (e.g., CCF). MISO is a masked isocyanate functional silane, with demasking temperatures about 150 to about 200° C. In exemplary embodiments, the composite (e.g., WG/ASCCF composite) provided about an 80% increase in strength, and showed superior fiber-matrix interfacial adhesion.

Current practice provides that urea-formaldehyde (UF) and phenol-formaldehyde (PF) resins are typical binders used by the particleboard industry. However, UF and PF resins are generally neither eco-friendly nor safe due to health effects of exposure to formaldehyde emissions. Moreover, formaldehyde-based adhesives are derived from generally unsustainable petrochemicals. Furthermore, some advantages of natural fibers over traditional reinforcing and man-made fibers are their low cost, low density, good specific mechanical properties, high toughness, non-abrasive behavior during processing, enhanced energy recovery, biodegradability and availability. In exemplary embodiments, the present disclosure provides systems/methods for fabricating particleboard (e.g., formaldehyde-free particleboard) utilizing natural fibers/materials (e.g., lignocellulosic materials), wherein the particleboard has improved performance characteristics and/or mechanical properties, thereby providing a significant manufacturing, commercial and environmental advantage as a result.

As noted, the present disclosure provides for improved systems/methods for fabricating a formaldehyde-free particleboard from fibers and/or lignocellulosic materials, along with a binder material (e.g., wheat gluten, diphenylmethane diisocyanate, etc.). In exemplary embodiments, the fiber/lignocellulosic material is treated with sodium hydroxide and/or a silane coupling agent as an adhesion promoter to enhance interfacial adhesion between the fiber and the binder.

As such, the present disclosure provides that fiber-reinforced biocomposites may be advantageously fabricated. For example, natural fibers may be chemically modified by sodium hydroxide and/or a silane treatment. In exemplary embodiments, (3-triethoxysilylpropyl)-t-butylcarbamate (MISO), which is a masked isocyanate functional silane, may be advantageously utilized to improve interfacial adhesion between the binder (e.g., wheat gluten) and the natural fibers. Moreover, X-ray photoelectron spectroscopy (XPS) and gas chromatography/mass spectroscopy (GC/MS) have been employed to prove the presence of the silane on silane-treated fiber, and also to prove the presence of the silane on alkali-followed by silane-treated fiber.

As noted, one exemplary silane utilized for the fiber treatment (e.g., fiber surface treatment) was (3-triethoxysilylpropyl)-t-butylcarbamate, which is a masked isocyanate functional silane (MISO), with demasking temperatures about 150 to about 200° C. In exemplary embodiments, the effects of surface treatments of the fibers with respect to mechanical properties of the biocomposites reinforced with the treated fibers have been investigated, as discussed below.

The present disclosure will be further described with respect to the following examples; however, the scope of the disclosure is not limited thereby. The following examples illustrate the process of the disclosure of producing particleboard (e.g., formaldehyde-free particleboard) utilizing natural fibers/materials (e.g., lignocellulosic materials), wherein the particleboard has improved performance characteristics and/or mechanical properties.

EXAMPLE 1

Materials: The American vital wheat gluten (WG) was supplied by Arrowhead Mills, USA, and contained about 80% proteins, about 10% water and about 10% starch, along with other minor components such as lipids and ash (see, e.g., Ye et al., *J Polym Environ.*, 2006, 14, 1-7).

The wheat gluten was dried in a vacuum oven at about 50° C. for about 12 hours (moisture content about 3%) before use. (3-triethoxysilylpropyl)-t-butylcarbamate (masked isocyanate silane; MISO) was purchased from Gelest Inc., USA. Sodium hydroxide was supplied by Fisher Scientific, USA. Acetone was obtained from J. T. Baker, USA. The coconut fiber (CCF) was received from Lanka Coco Products, Ltd., Sri Lanka. Physical and mechanical properties of coconut fiber are shown in Table 1.

It is noted that other fibers or lignocellulosic fibers/materials (e.g., tree fibers/materials, bamboo, hemp, cereal straw, rice husks, bagasse, etc.) may be used in lieu of CCF in the systems, processes, methods and examples of the present disclosure. In this regard, it is noted that lignocellulosic fiber chemistry indicates that the masked isocyanate silane chemistry applies to fibers from trees (e.g., hardwood and softwood trees, such as, for example, pine, rubber, banana, etc.), as well as to other plant fibers (e.g., bamboo, hemp, cereal straw, rice husks, bagasse, etc.). It is further noted that lignocellulosic fibers/materials have many hydroxyl (OH) groups, and the masked isocyanate silane deposition chemistry relies in part on silanol condensation with the surface hydroxyls. Therefore, it is noted that the advantageous masked isocyanate formulations of the present disclosure are effective with lignocellulosic fibers/materials.

TABLE 1

Physical and mechanical properties of coconut fiber and E-glass fiber (Kalia et al., *Polym. Eng. Sci* (2009) 49, 1253-72)

| Fiber | Density (g/cm³) | Diameter (μm) | Tensile strength (MPa) | Young's modulus (GPa) | Elongation at break (%) |
|---|---|---|---|---|---|
| Coconut fiber | 1.15 | 100-450 | 131-175 | 4-6 | 15-40 |
| E-glass fiber | 2.5 | — | 2000-3500 | 70 | 2.5 |

It is noted that coconut fiber was not expected to add the very large increases in strength and stiffness obtained from glass fiber reinforcement, but the large elongation to break greatly improved the ductility of the composites, as illustrated below.

Fiber treatments: Coconut fiber (CCF) with a diameter of about 0.30 to about 0.55 mm was cut into about 40 mm lengths, and was dried in a vacuum oven at about 50° C. for about 2 hours (moisture content about 3%). Some of the CCF was then subjected to fiber treatments (e.g., surface treatments), as described below.

Alkali treatment (Mercerization): Some of the dried fibers (about 20 g) were soaked in about 2.5% w/v sodium hydroxide solution in water (about 1000 ml) for about 4 hours at room temperature, then washed thoroughly with distilled water until the rinse solution reached a pH of about 7.

Moreover, some of the dried fibers (about 20 g) were soaked in about 5% w/v sodium hydroxide solution in water (about 1000 ml) for about 4 hours at room temperature, then washed thoroughly with distilled water until the rinse solution reached a pH of about 7.

Additionally, some of the dried fibers (about 20 g) were soaked in about 10% w/v sodium hydroxide solution in water (about 1000 ml) for about 4 hours at room temperature, then washed thoroughly with distilled water until the rinse solution reached a pH of about 7.

Each batch (2.5% NaOH, 5% NaOH and 10% NaOH) of the alkali-treated fiber (ACCF) was dried at room temperature for about 12 hours, and then dried in a vacuum oven at about 50° C. for about 2 hours (moisture content about 3%).

Silane treatment: (3-triethoxysilylpropyl)-t-butylcarbamate (e.g., a masked isocyanate functional silane or MISO) was dissolved in about a 50/50 v/v solution of water and acetone (about 0.1 volume % silane in the solution). The pH was adjusted to about 4 with acetic acid, stirring the solution continuously for about 30 minutes.

Some of the dried (non-alkali treated) coconut fibers, as well as some of the dried alkali-treated fibers (ACCF –2.5%, 5%, and 10% NaOH treatment), were then soaked in the solution for about 2 hours.

The fibers were then removed from the silane solution, and the solvent was allowed to evaporate in an air stream at room temperature for about 2 hours. The fibers were dried in a vacuum oven at about 50° C. for about 12 hours. The CCF treated with only silane (non-alkali treated) is referred to as SCCF, while the alkali-treated fiber which was also treated with silane is referred to as ASCCF.

It is noted that the present disclosure contemplates that the silane (e.g., masked isocyanate functional silane) may be incorporated/contacted and/or mixed/blended with the fibers, materials, mixtures, blends and/or samples in a variety of ways, and at various different steps in the fabrication process. For example, the silane (MISO) may be incorporated into the sodium hydroxide solution discussed above, and the fibers may be simultaneously soaked in the NaOH and the silane solution, followed by the drying and composite preparation (e.g., mixing/incorporating with binder and/or molding) steps.

Alternatively, the silane (MISO) may be deposited (e.g., via liquid spraying or the like) onto the lignocellulosic fibers/materials (e.g., after the NaOH treatment), and then the silane-treated fibers may be mixed/incorporated with a binder (if desired) and then molded/fabricated. It is noted that the lignocellulosic fibers/materials may be mixed/blended with the binder material (if desired) before, during, or after the silane treatment (e.g., silane treatment via liquid spraying or the like). For example, it is noted that the binder material may be contacted/deposited (e.g., via liquid spraying or the like) onto and/or mixed/blended (e.g., as a liquid or solid) with the lignocellulosic fibers/materials before, during or after the silane treatment (e.g., silane liquid spraying treatment, substantially solid-silane mixing step, and/or after silane solution soaking treatment, etc.).

In certain embodiments, the alkali-treatment step (if desired) may be followed by a silane-treatment step where the MISO silane is mixed/contacted with the other components (e.g., fibers/materials and binder) in substantially one step (e.g., a solids mixing step with MISO/MISO powder and/or binder, and/or a liquid spray treatment step with MISO and/or binder, etc.), followed then by a molding/fabrication step. As noted, the silane-treatment step(s) could have several variations, such as, for example, a silane-treatment step where the components (fibers/materials, MISO silane and/or binder) are mixed/blended together as solids, and/or as a step where the MISO silane and/or binder (if desired) is sprayed onto the lignocellulosic fibers/materials (and other solids) as a liquid.

Composite preparation: Mixtures (e.g., mixtures obtained via mechanical mixing or the like), blends or samples (about 700 mg total for each sample/mixture) of: (i) wheat gluten (WG); (ii) WG/CCF; (iii) WG/ACCF; (iv) WG/SCCF; and (v) WG/ASCCF were then compression-molded at about 150° C. for about 10 minutes, and at about $8.9 \times 10^4 N$ (about 20,000 $lb_f$), in a stainless steel mold to form about 4×0.5×0.2 cm bars.

For the mixtures, blends or samples that were fabricated into the composites/bars (ii) through (v) listed above, the ratio of WG to CCF, ACCF, SCCF or ASCCF was about 85/15 by weight percent.

Methods—Fourier transform infrared (FTIR) spectroscopy: FTIR spectra of ground CCF and ACCF were taken using a Nicolet Magna-IR 560 spectrometer. The KBr pellet technique was used to prepare samples. Data was collected from 4000-400 $cm^{-1}$ in the middle-infrared region with 32 scans at a resolution of about 4 $cm^{-1}$. The spectra were analyzed using Omnic software, version 7.2a, from the Thermo Electron Corporation.

Scanning electron microscopy (SEM): The surface morphology of CCF and ACCF at various concentrations of sodium hydroxide solution, as well as the fracture surfaces of all composites after failure under tensile test were examined by SEM using JEOL 6335F field emission scanning electron microscope (FE-SEM) with 10 kV accelerating voltage. All samples were coated with gold before SEM observation.

X-ray photoelectron spectroscopy (XPS) surface analysis: The XPS spectra of CCF, SCCF, ACCF and ASCCF were recorded with a Perkin-Elmer PHI 595 Multiprobe system with an alumina/magnesium twin x-ray source. The fibers were mounted onto a holder with double-sided carbon tape and placed in a vacuum at about $10^{-8}$ torr. All the scans were performed with a survey run of binding energy between 1100 to 0 eV, pass energy of 50 eV and ev/s=0.1 eV.

Gas chromatography/mass spectroscopy (GC/MS) analysis: GC/MS determinations of ACCF, SCCF and ASCCF (about 1.1 g) were performed on a HP 6890 Series GC/MS system with direct dynamic thermal desorption (syringeless injection). A Zebron ZB-1 capillary column (30 mL×0.25 mm I.D.×1.00 µm film thickness) was used with temperature program from 35 (held for about 2 min) to 325° C. using helium carrier gas at about 15° C./min. The temperature of the splitless injector was kept at about 225° C. with purge delay time of about 2 min. Mass spectra of all samples were recorded at scan range of 10 to 700 dalton (scan range 100 to 300 dalton at first 6 min).

Mechanical property testing: The molded bars were used for a three-point bending test performed according to the standard test methods for flexural properties, ASTM D790-02. The tests were conducted on a computer-interfaced Instron 1011 with a 50 N load cell. The rate of crosshead motion was about 1 mm/min, while the data acquisition rate was 10 points per second. Three to five replicates were performed for each sample.

Fracture characteristic of WG composites: The molded bars prepared as described in the composite preparation section were broken under tensile loading using the Instron 1011 with cross head speed of about 1 mm/min. The tensile fractured surface of the composites was observed by using JEOL 6335F FE-SEM. All fractured specimens were sputtered with gold prior to SEM examination.

Results and Discussion

Infrared spectroscopy (FTIR): FIG. 1 (a-b) shows FTIR spectra of CCF and ACCF treated with about 5 wt % NaOH solution, respectively. The change in surface composition of ACCF can be investigated by infrared spectra. It can be seen that there is an absorption band of the carbonyl groups in the hemicellulose at 1742 cm$^{-1}$ in the CCF spectra (see, e.g., Mohanty et al., *Natural Fibers, Biopolymers And Biocomposites*, CRC Press, Taylor & Francis Group (2005) p. 199). However, no peak at 1742 cm$^{-1}$ is observed in the ACCF spectra. This change in the spectra indicates extraction of hemicellulose from the fiber surface by the aqueous alkaline solution during the surface treatment process.

SEM of alkali-treated coconut fiber (ACCF): The morphology of untreated CCF and alkali-treated fibers (ACCF) at different concentrations of sodium hydroxide solution investigated by SEM is shown in FIG. 2A-D. The alkali-treated CCF (FIGS. 2B-D) has a rough surface topography and a fibrillar formation due to the removal of impurities, wax, as well as some hemicellulose and lignin covering the external surface of the fibers.

The surface of the untreated fiber (FIG. 2A) appears to be smoother than the alkali-treated fiber (see, e.g., Li et al., *J. Polym. Environ.*, (2007) 15, 25-33). In exemplary embodiments, the surface roughness may enhance the fiber-polymer adhesion. Treatment with about 5% NaOH provided better mechanical properties than the untreated CCF, the about 2.5% NaOH ACCF, and the about 10% NaOH ACCF. Therefore, the exemplary results below for ACCF and ASCCF used the about 5% NaOH solution.

Figure 3:
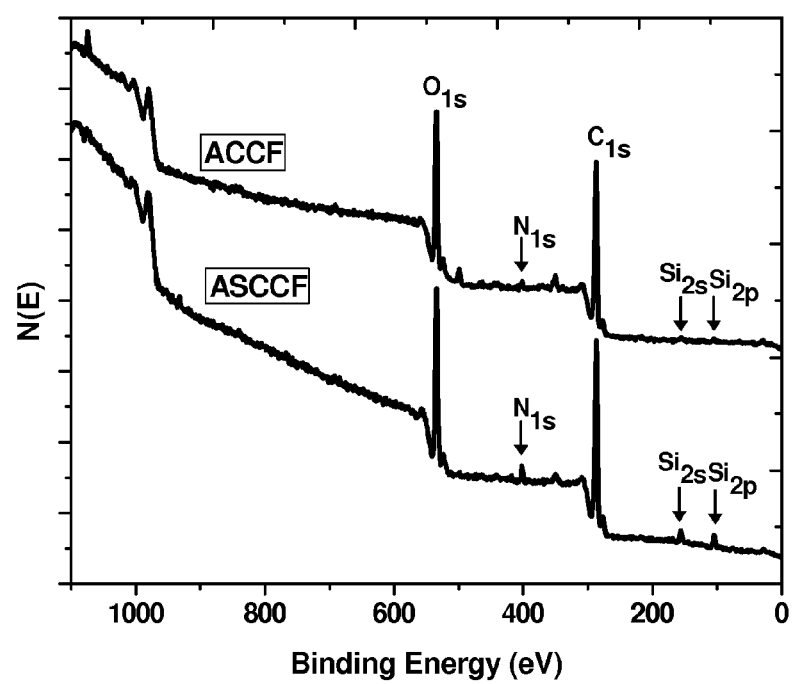
FIG. 3 depicts XPS survey spectra of ACCF, and alkali-followed by silane-treated fiber (ASCCF)

X-ray photoelectron spectroscopy (XPS) surface analysis of all fibers: XPS analysis was used to give evidence of silane presence on the surface of SCCF and ASCCF. FIG. 3 presents the XPS survey spectra of electron intensity as a function of binding energy for ACCF and ASCCF. It is noted that the survey spectra for CCF and SCCF look very similar (not shown). Elemental compositions on the surface of the fibers are also summarized in Table 2.

The peaks of carbon ($C_{1s}$) and oxygen ($O_{1s}$) at about 284 and 531 eV, respectively, are predominant (see, e.g., Wagner et al., *Handbook Of X-Ray Photoelectron Spectroscopy*, Perkin-Elmer Corp., Eden Prairie, Minn., (1979)). The major elements including natural fibers, consisting of cellulose, hemicellulose, lignin and wax, are carbon, oxygen and hydrogen. Therefore, it is not surprising that high electron intensity of carbon and oxygen was detected in all cases. Elements such as silicon, potassium, sodium, magnesium, calcium, iron, aluminum, sulfur, copper, and phosphorus were also found in the coconut fibers in much smaller quantities (see, e.g., Raveendran et al., *Fuel*, (1995) 74, 1812-22; Jústiz-Smith et al., *Mater. Charact.*, (2008) 59, 1273-78).

Figure 4:
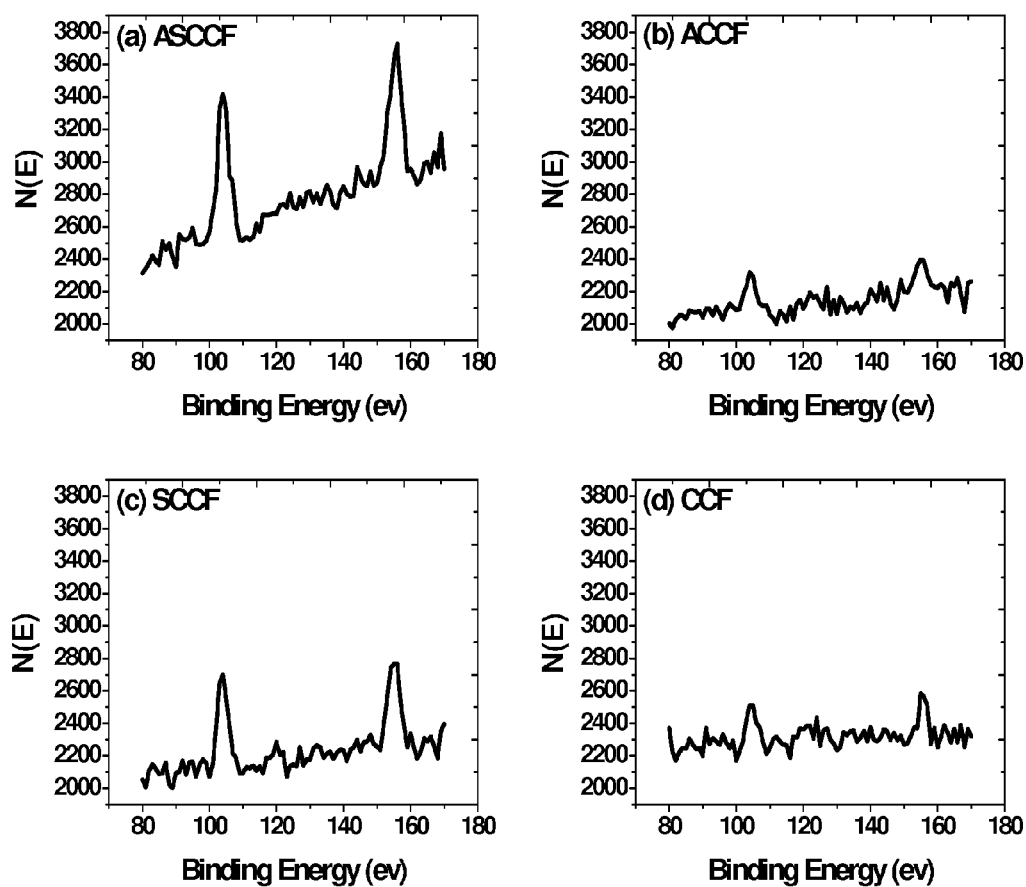
FIGS. 4A-D depict XPS high-resolution spectra of $Si_{2p}$ at 102 eV and $Si_{2s}$ at 154 eV in the region between 80 and 170 eV for: (a) ASCCF, (b) ACCF treated with about 5 wt % NaOH solution, (c) silane-treated coconut fiber (SCCF), and (d) CCF.

In FIG. 3, a very small amount of silicon was observed near 102 and 154 eV corresponding to $Si_{2p}$ and $Si_{2s}$, respectively, in ACCF (and also CCF). In the case of ASCCF (and SCCF), the intensity of $Si_{2p}$ and $Si_{2s}$ peaks at 102 and 154 eV is higher than that of ACCF. In addition, higher intensity of $N_{1s}$ peak at 399 eV for ASCCF and SCCF was detected compared to the coconut fibers without silane. The high-resolution spectra of $Si_{2p}$ and $Si_{2s}$ in the region between 80 and 170 eV, are presented in FIG. 4. Silane treatment more than doubled the fraction of silicon on the surface of the fibers. Furthermore, there was a significant increase in the amount of silicon present in spectra of ASCCF (FIG. 4A) compared to that of SCCF (FIG. 4C). Thus, the alkaline treatment of the fiber prior to silane increased the amount of bonded silane on the surface of the fiber.

TABLE 2

Elemental surface compositions and binding energies for the fibers determined from XPS analysis.

| | Elemental composition (%) | | | |
|---|---|---|---|---|
| Fiber | C(1s) (284 eV) | O(1s) (531 eV) | Si(2p) (102 eV) | N(1s) (399 eV) |
| CCF | 72.59 | 24.33 | 1.94 | 1.14 |
| ACCF | 73.71 | 23.26 | 1.74 | 1.29 |
| SCCF | 69.81 | 23.11 | 4.53 | 2.55 |
| ASCCF | 69.20 | 21.75 | 5.95 | 3.10 |

Gas chromatography/Mass spectroscopy (GC/MS) analysis: The masked isocyanate functional silane, (3-triethoxysilylpropyl)-t-butylcarbamate, or MISO, was used to improve the adhesion of binder (e.g., wheat gluten) to fiber (e.g., coconut fiber). Because of its high reactivity, especially to moisture, and its toxicity, isocyanate is generally vulnerable to premature reaction when used with natural fibers.

In exemplary embodiments, isocyanate functionality of the MISO was advantageously masked in the form of carbamate. In general, demasking of the isocyanate group occurred during the heat-press processing step with demasking temperatures around about 150 to about 200° C. (see, e.g., Arkles, B., *Silane Coupling Agents: Connecting Across Boundaries* V2.0, Gelest, Inc., Morrisville, Pa., (2006) p. 16). During demasking of MISO (1), tert-butyl alcohol (2) was emitted and 3-isocyanatopropyltriethoxysilane (3) was formed, as illustrated in Scheme 1.

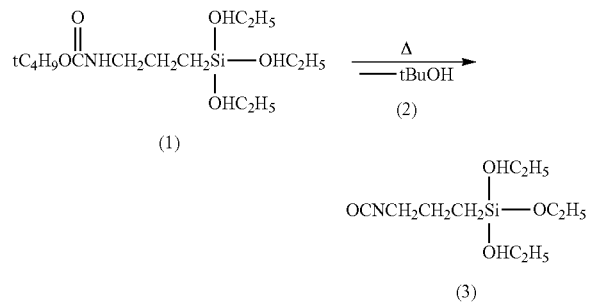

Scheme 1 - Demasking reaction of (3-triethoxysilylpropyl)-t-butylcarbamate (MISO):

Gas chromatography/mass spectroscopy (GC/MS) was used to complement the XPS described above as an additional technique to check for the presence of the silane on the fiber. As shown in Scheme 1, tert-butyl alcohol is released when MISO is heated, and at the demasking temperature, the tert-butyl alcohol is emitted as a vapor. GC/MS was employed to detect emitted tert-butyl alcohol from SCCF and ASCCF. The temperature of the GC injector was kept at about 225° C., which was a little bit higher than the demasking temperature, to make sure that tert-butyl alcohol completely discharged from the silane-coated coconut fibers.

Figure 5A:
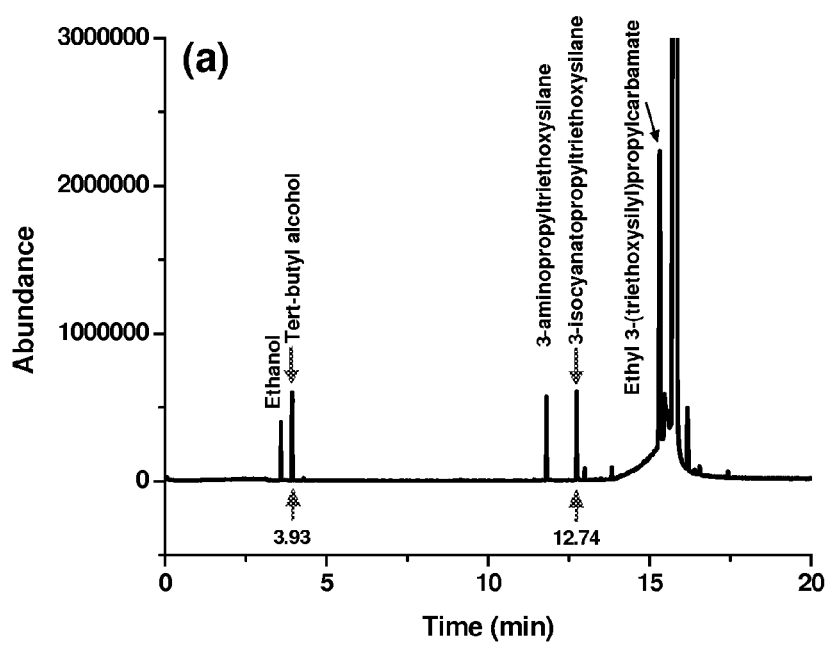
FIGS. 5A-C depict representative GC/MS analysis of masked isocyanate functional silane (MISO)
Figure 5B:
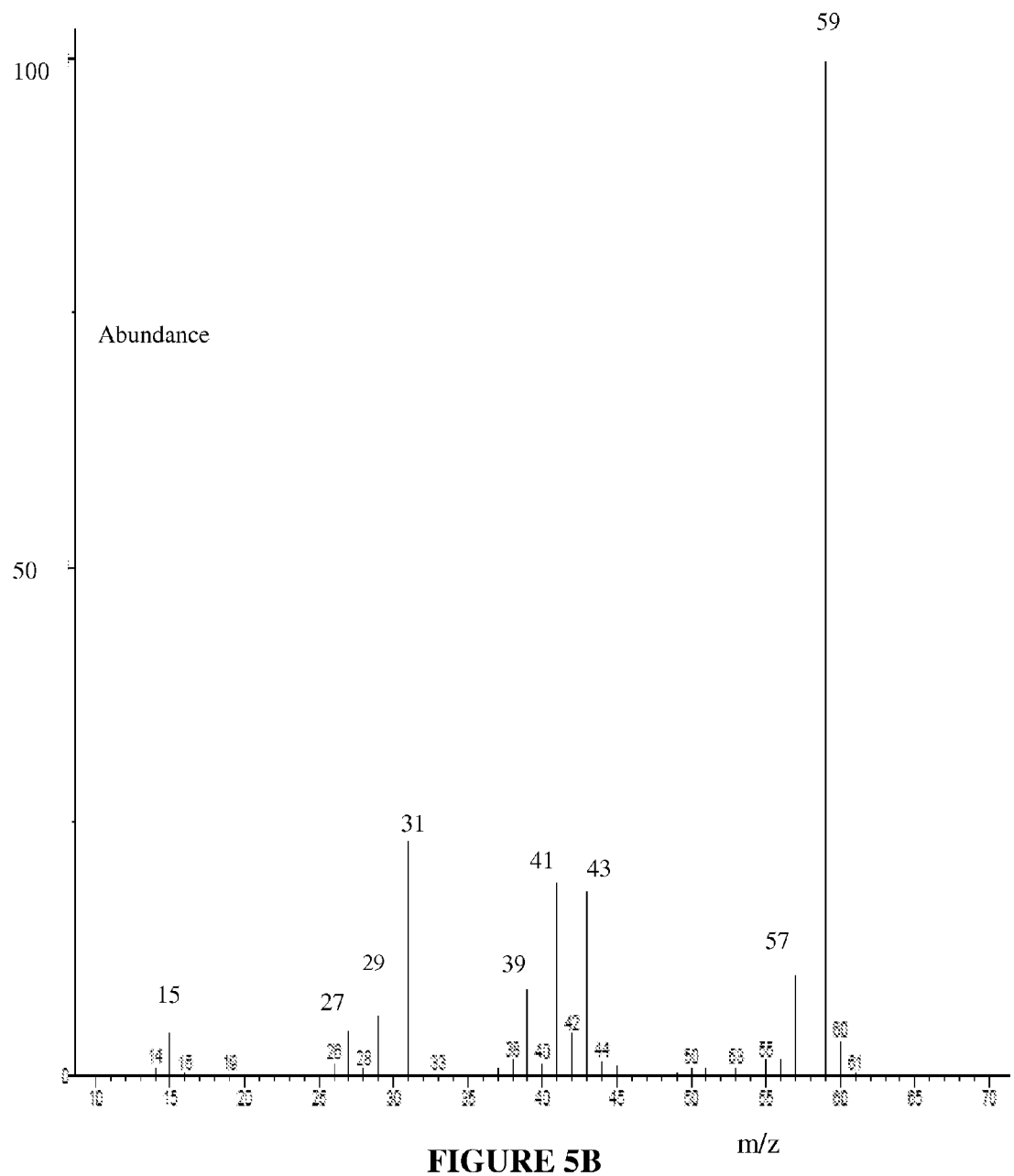
Figure 5C:
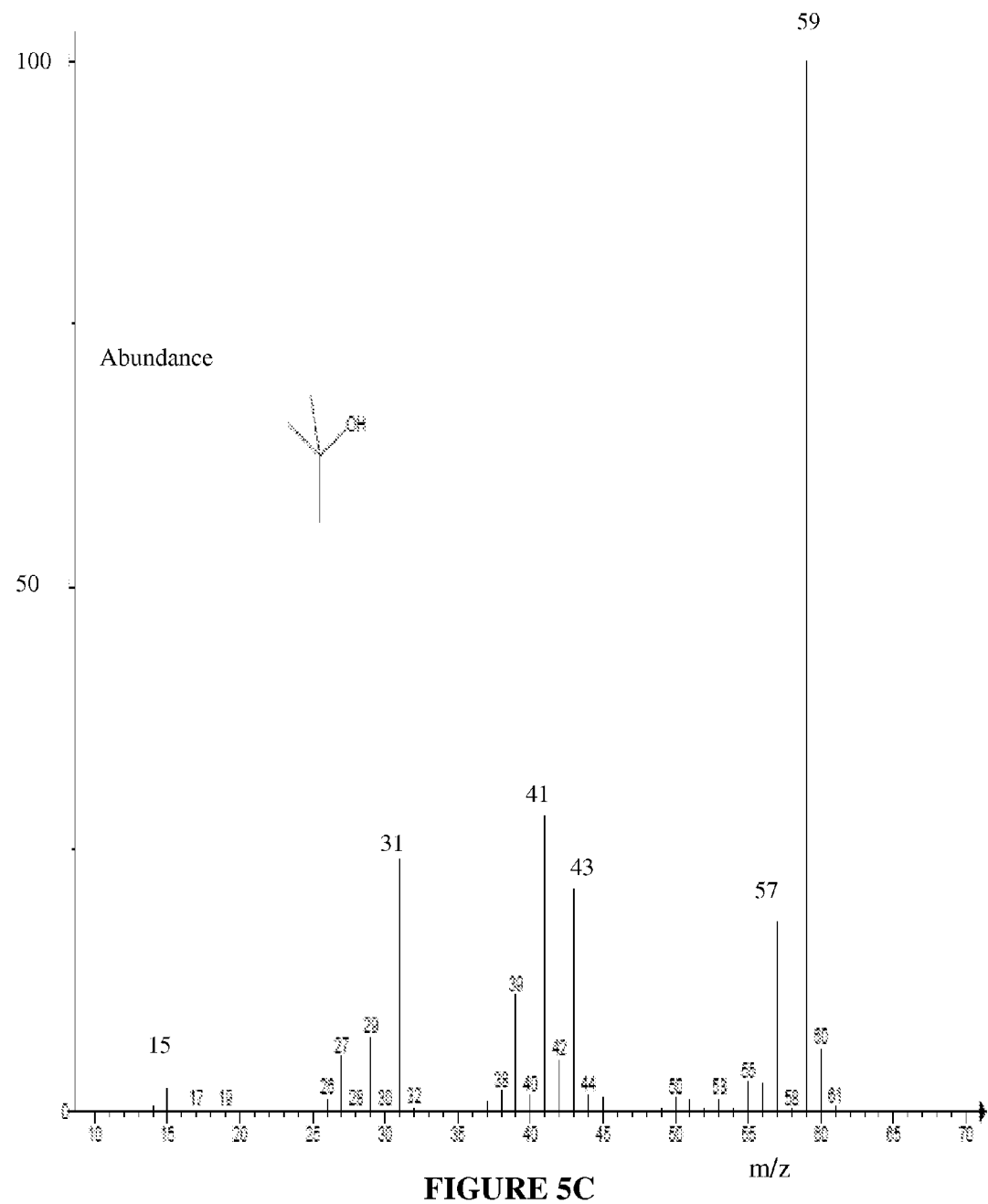

FIG. 5 demonstrates the ability of this technique to detect the emitted tert-butyl alcohol from the MISO demasking reaction. FIG. 5A presents a gas chromatogram of a MISO reference at a concentration of about 4.95 ppb. FIG. 5B shows the mass spectrum of the GC peak at retention time of about 3.93 min, corresponding to tert-butyl alcohol. A mass spectrum of high purity tert-butyl alcohol, containing a prominent m/z 59 ion is provided in FIG. 5C, illustrating very close correspondence with FIG. 5B and verifying that the GC peak at 3.93 min is indeed tert-butyl alcohol. Besides the tert-butyl alcohol found in the GC of demasked MISO, 3-isocyanatopropyltriethoxysilane (3) was observed at a retention time of about 12.74 min, and this was also verified with mass spectroscopy.

The gas chromatograms of ACCF, SCCF, and ASCCF, at retention times between about 2.5 and about 5 min, are presented in FIGS. 6A-C. In FIG. 6A, there is no appearance of tert-butyl alcohol peak at retention time of about 3.93 min. On the other hand, the GC/MS analysis revealed that SCCF and ASCCF contained a peak with a retention time at about 3.93 min consistent with tert-butyl alcohol. Moreover, the peak area of m/z 59 ion of tert-butyl alcohol in the chromatogram of ASCCF is higher than that of SCCF, as shown in Table 3, implying more of the silane bonded to ASCCF than to SCCF. This result is in agreement with the result found in the XPS analysis. It is noted that additional work with calibrated standards is to be performed for quantitative analysis of the silane surface coverage on coconut fibers.

TABLE 3

Peak area of m/z 59 ion of tert-butyl alcohol for SCCF and ASCCF:

| Sample | Retention time of tert-butyl alcohol (min) | Peak area of m/z 59 ion of tert-butyl alcohol |
|---|---|---|
| ACCF | N/A | 0 |
| SCCF | 3.926 | $1.5 \times 10^6$ |
| ASCCF | 3.928 | $6.6 \times 10^6$ |

Figure 7E:
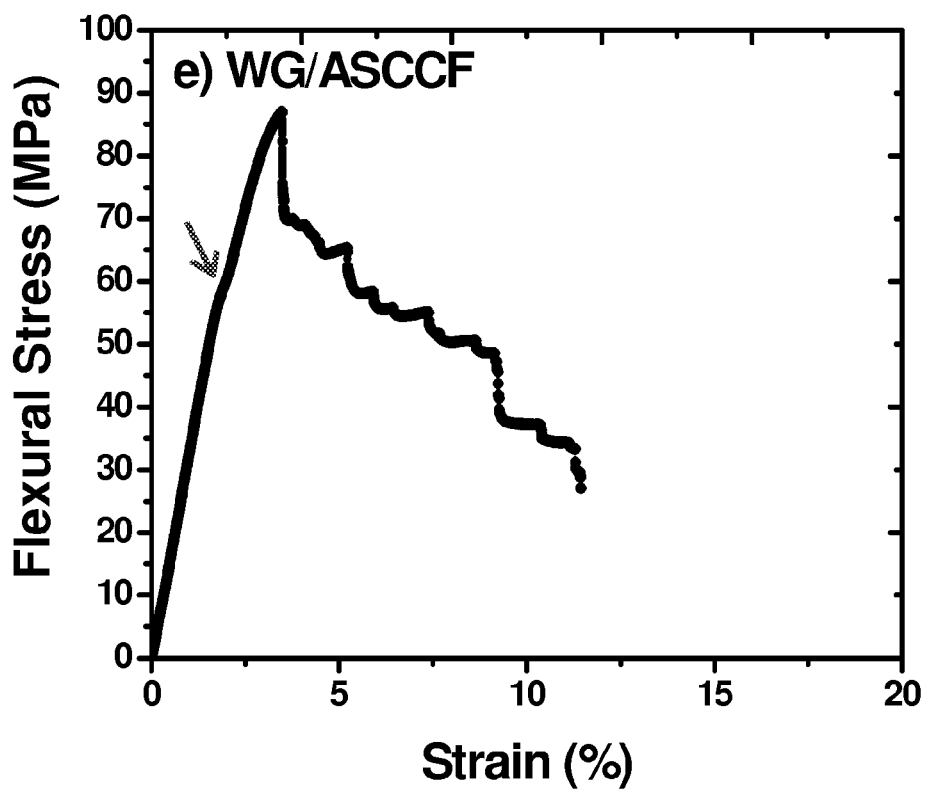

Mechanical Properties of Prepared Composites:

The mechanical properties of the exemplary composites are shown in Table 4. The first failure stress values are the stresses at which the wheat gluten (WG) matrix began to crack, and are illustrated in FIGS. 7A-E. The mechanical properties of the WG composite with unmodified fiber (WG/CCF) slightly improved with respect to those of WG plastic (FIGS. 7A and 7B).

With regards to alkaline treatment, the mechanical properties of WG composites with ACCF treated in low concentration (about 2.5% NaOH solution) were comparable to those of the WG/CCF composite, whereas the properties of WG/ACCF treated in about 10% NaOH solution decreased with respect to the WG/CCF composite. Without being bound by any theory, it is believed that the decrease in strength may be due to the high alkaline concentration depolymerizing the native cellulose, resulting in a weaker or damaged fiber, which can adversely affect fiber strength. This result is consistent with the SEM result (FIG. 2D) showing the surface topography of alkali-treated fiber. A similar trend of decrease in the strength of composites reinforced with natural fiber treated with about 10 wt % NaOH solution has been reported (see, e.g., Mishra et al., *Compos. Sci. Technol.*, (2003) 63, 1377-85).

In exemplary embodiments of the present disclosure, the optimum NaOH concentration found was about 5% NaOH. This concentration was used for the ASCCF preparations. In general, without alkali surface treatment, the silane-treated fiber reinforced composite (WG/SCCF) provided little improvement in the mechanical properties compared to the WG/CCF composite. In exemplary embodiments, it was found that the alkali-followed by silane-treated fiber reinforced composite (WG/ASCCF) significantly improved the mechanical properties. Without being bound by any theory, it is believed that this may be due to the removal of waxes, hemicelluloses, and/or partial lignin on the fiber surface, which thereby enhances the availability of sites for the cellulose-silane interactions. Indeed, more of the silane was found on ASCCF than on SCCF, as noted/illustrated above in the XPS and GC/MS analyses.

TABLE 4

Mechanical properties of WG composites reinforced with coconut fiber:

| Sample | % NaOH Treatment | Modulus (GPa) | First Failure Stress (MPa) | Elongation (%) |
|---|---|---|---|---|
| WG | 0 | 2.78 ± 0.20 | 46.22 ± 1.56 | 1.61 ± 0.05 |
| WG/CCF (85/15 wt %) | 0 | 2.97 ± 0.22 | 48.35 ± 2.28 | 1.69 ± 0.06 |
| WG/SCCF (85/15 wt %) | 0 | 3.04 ± 0.15 | 49.98 ± 2.57 | 1.74 ± 0.16 |
| WG/ACCF (85/15 wt %) | 2.5 | 2.98 ± 0.05 | 47.89 ± 1.42 | 1.65 ± 0.03 |
| WG/ACCF (85/15 wt %) | 5 | 3.14 ± 0.20 | 51.74 ± 3.68 | 1.61 ± 0.10 |
| WG/ACCF (85/15 wt %) | 10 | 2.85 ± 0.11 | 45.55 ± 1.42 | 1.60 ± 0.04 |
| WG/ASCCF (85/15 wt %) | 5 | 3.28 ± 0.15 | 58.60 ± 2.17 | 1.89 ± 0.10 |

FIGS. 7A-E present typical stress-strain curves of WG and WG composites reinforced with untreated and treated CCF. In FIG. 7A, there is substantially no ductile behavior in the stress-strain curve of the WG composite, which is different from those of the composites reinforced with the fibers. For the WG/fiber composites, the first failure where the WG matrix cracked is shown in FIGS. 7B-E (arrow sign) and reported in Table 4. After the WG matrix failure, the stress still increased because it was transferred to the interface and the fibers. When the interface and the fibers broke, a decrease in stress was observed. In order to qualitatively compare the interfacial adhesion of the WG matrix and the fibers in the composites, the ratio of maximum stress to stress at the first failure was calculated and reported in Table 5. The WG/ASCCF composites showed the highest value of the ratio, which indicates that this composite has the strongest interfacial interaction between the WG matrix and ASCCF. This most likely resulted in the superior mechanical properties of the WG/ASCCF composite.

TABLE 5

Ratio of maximum stress to stress at the first failure of WG/fiber composites:

| Sample | Maximum stress (MPa) | Maximum stress/stress at the first failure |
|---|---|---|
| WG | 46.22 ± 1.56 | 1.00 ± 0.00 |
| WG/CCF | 53.19 ± 1.32 | 1.10 ± 0.04 |
| WG/SCCF | 58.98 ± 4.14 | 1.18 ± 0.05 |
| WG/ACCF | 65.70 ± 8.16 | 1.27 ± 0.05 |
| WG/ASCCF | 83.83 ± 8.76 | 1.43 ± 0.08 |

Tensile Fracture Behavior and Surface Fracture Characteristic of WG Composites:

FIGS. 8A-I illustrate the fiber pullout characteristics of WG/CCF, WG/ACCF, and WG/ASCCF composites after failure under tensile testing. FIGS. 8A-C show the pulled out fibers and FIGS. 8D-I show the tensile fractured surfaces of the composites. From FIG. 8A, long fiber lengths of pullout are found in WG/CCF composite, while long and short fiber pullout lengths are observed in WG/ACCF (FIG. 8B). In the case of WG/ASCCF, much shorter fiber pullout length is clearly evident.

The fractured surface images of the WG/CCF composite show extensive fiber pullout where many smooth holes remain after the fibers were pulled out (FIG. 8D), indicating extensive interfacial debonding between CCF and the WG matrix (FIG. 8G). Compared to WG/CCF, the WG/ACCF composite showed less fiber pullout and debonding (FIG. 8E and FIG. 8H). In the case of WG/ASCCF composite, even less fiber pullout is observed. Also, the WG matrix appears well adhered to the broken fibers due to the absence of gaps between fibers and surrounding matrix (FIG. 8F and FIG. 8I). These results indicate very poor interfacial bonding between fiber and matrix in the WG/CCF composite, and weak interfacial adhesion in the WG/ACCF composite. However, in the case of the WG/ASCCF composite, improved fiber-matrix interfacial adhesion was observed, thereby enhancing the mechanical properties.

Conclusions:

For the WG composites reinforced with coconut fiber, the interfacial adhesion between the fibers and the WG affects the mechanical properties of the composites. Fiber surface treatment with a masked isocyanate silane can enhance WG matrix/coconut fiber adhesion. Alkali treatment slightly improved surface adhesion by removing impurities, the hemicelluose, and/or lignin covering the CCF surface, thereby producing a rough surface topography of the ACCF. Substantial improvements in mechanical properties were obtained by following the alkali surface treatment with the silane treatment on the fiber. XPS and GC/MS indicated that the alkali surface treatment led to a much larger silane surface coverage than if no alkali treatment was applied to the fiber.

The failure of the wheat gluten changed from very brittle with no CCF to very ductile with CCF, ACCF, SCCF, and ASCCF reinforcement. The improved adhesion in the ASCCF reinforced WG matrix led to a roughly 25% increase in the stress at the first failure point on the stress/strain curve and a roughly 80% increase in the maximum stress. The improved adhesion also reduced the fiber pullout lengths observed on the failure surfaces of tensile test specimens.

EXAMPLE 2

Materials: American vital wheat gluten (WG) was supplied by Arrowhead Mills, USA. It contained about 80% proteins, about 10% water and about 10% starch, and other minor components such as lipids and ash. WG was dried in a vacuum oven at about 50° C. for about 12 hours (moisture content about 3%) before use.

Coconut fiber (CCF) and coconut coir pith (CCP) were received from Lanka Coco Products, Ltd., Sri Lanka. (3-triethoxysilylpropyl)-t-butylcarbamate (a masked isocyanate silane) was purchased from Gelest Inc., USA. Sodium hydroxide was supplied by Fisher Scientific, USA. Acetone was obtained from J. T. Baker, USA.

Coconut Fiber And Coconut Pith Preparation: Coconut fiber (CCF) with a diameter around 0.30-0.55 mm was cut into about 40 mm lengths and was dried in a vacuum oven at about 50° C. for about 2 hours (moisture content about 3%). Some of the CCF was then subjected to surface treatments.

Coconut pith (CCP) was sieved to obtain a particle size of <250 µm and dried in a vacuum oven at about 50° C. for about 2-4 hours (moisture content about 10%).

As discussed above, it is again noted that other fibers or lignocellulosic fibers/materials (e.g., tree fibers/materials, bamboo, hemp, cereal straw, rice husks, bagasse, etc.) may be used in lieu of CCF and/or CCP in the systems, processes, methods and examples of the present disclosure.

Fiber Treatments:

Alkaline treatment (Mercerization): Samples of dried fibers (CCF) were soaked in: (i) about 2.5%; (ii) about 5%; and (iii) about 10% w/v sodium hydroxide solution in water for about 4 hours at room temperature, then washed thoroughly with distilled water until the rinse solution reached a pH of about 7. Each batch of alkaline-treated fibers (ACCF) was then dried at room temperature for about 12 hours, and then dried in a vacuum oven at about 50° C. for about 2 hours (moisture content about 3%).

Silane treatment: (3-triethoxysilylpropyl)-t-butylcarbamate of about 5 wt %, with respect to the fiber weight, was dissolved in about a 50/50 v/v solution of water and acetone (about 0.1 volume % silane in the solution). The pH was adjusted to about 4 with acetic acid, stirring the solution continuously for about 30 minutes.

Some of the dried (non-alkali treated) CCF, as well as some of the dried alkali-treated fibers (ACCF −2.5%, 5% and 10% NaOH treatment), were then soaked in the silane solution for about 2 hours. The fibers were then removed from the solution, and the solvent was allowed to evaporate in an air stream at room temperature for about 2 hours. The fibers were dried in a vacuum oven at about 50° C. for about 12 hours. The CCF treated with only silane (non-alkali treated) is referred to as SCCF, while the alkali-treated fiber which was also treated with silane is referred to as ASCCF.

Again, it is noted that the present disclosure contemplates that the silane (e.g., masked isocyanate functional silane) may be incorporated/contacted and/or mixed/blended with the fibers, materials, mixtures, blends and/or samples in a variety of ways, and at various different steps in the fabrication process. For example, the silane (MISO) may be incorporated into the sodium hydroxide solution discussed above, and the fibers may be simultaneously soaked in the NaOH and the silane solution, followed by the drying and composite preparation (e.g., mixing/incorporating with binder and/or molding) steps.

Alternatively, the silane (MISO) may be deposited (e.g., via liquid spraying or the like) onto the lignocellulosic fibers/materials (e.g., after the NaOH treatment), and then the silane-treated fibers may be mixed/incorporated with a binder (if desired) and then molded/fabricated. It is noted that the lignocellulosic fibers/materials may be mixed/blended with the binder material (if desired) before, during, or after the silane treatment (e.g., silane treatment via liquid spraying or the like). For example, it is noted that the binder material may be contacted/deposited (e.g., via liquid spraying or the like) onto and/or mixed/blended (e.g., as a liquid or solid) with the lignocellulosic fibers/materials before, during or after the silane treatment (e.g., silane liquid spraying treatment, substantially solid-silane mixing step, and/or after silane solution soaking treatment, etc.).

In certain embodiments, the alkali-treatment step (if desired) may be followed by a silane-treatment step where the MISO silane is mixed/contacted with the other components (e.g., fibers/materials and binder) in substantially one step (e.g., a solids mixing step with MISO/MISO powder and/or binder, and/or a liquid spray treatment step with MISO and/or binder, etc.), followed then by a molding/fabrication step. As noted, the silane-treatment step(s) could have several variations, such as, for example, a silane-treatment step where the components (fibers/materials, MISO silane and/or binder) are mixed/blended together as solids, and/or as a step where the MISO silane and/or binder (if desired) is sprayed onto the lignocellulosic fibers/materials (and other solids) as a liquid.

Composite particleboard preparation:

Small bars (about 4×0.5 cm) of the composites were prepared first to examine the mechanical properties, while larger samples or particleboards (about 14×21.5 cm) were prepared for nail-driving tests. Table 6 below lists the approximate weight percent ratios of the various components for the exemplary composites/particleboards.

The CCP, CCP/WG, CCP/ASCCF, and CCP/ASCCF/WG samples, mixtures (e.g., mechanical mixtures) or blends (about 700 mg total sample/mixture weight for each small bar, and about 105 g total sample/mixture weight for each big board) were compression-molded at about 160° C. for about 20 minutes at about 20 klb$_f$ in a mold to form the small bars, and at about 160° C. for about 20 minutes at about 30-40 klb$_f$ for the big particleboards.

Mechanical property testing:

The small molded bars were used for a three-point bending test performed according to ASTM D790-02, while the mechanical property tests of the big particleboards were performed according to the standard test methods for evaluating properties for wood-based fiber and particle panel materials, ASTM D1037-99A.

Nail-Driving Test:

This test was made to examine the strength of the boards when nails were driven into them. Nails of about 2.18 mm in diameter were driven into the particleboards substantially perpendicular to the plane of the boards. Four replicates were performed for each sample. The results of the nail-driving test are shown in FIGS. 10A-C.

Results and Discussion:

The small bars of the coconut-based particleboards were prepared to determine the mechanical properties of the boards as shown in Table 6. FIGS. 9A-D also show the stress-strain curves of the particleboards. The coconut pith particleboard made from coconut pith with the WG binder (CCP/WG) has higher modulus and strength than the particleboard without the binder. In the case of the binderless particleboards, the CCP/ASCCF board has better mechanical properties than the CCP board. In general, the CCP/ASCCF/WG particleboard has the most desirable properties. These results indicate that wheat gluten is a good binder. The addition of the ASCCF into the WG-glued particleboard enhances the mechanical properties of the composite particleboard.

TABLE 6

Mechanical properties of particleboards based on coconut materials:

| Composites | Ratio (% wt) | Modulus[a] (GPa) | Strength[a] (MPa) | Elongation[a] (%) |
|---|---|---|---|---|
| CCP | 100 | 2.97 ± 0.24 | 23.69 ± 3.05 | 0.81 ± 0.11 |
| CCP/WG | 90/10 | 3.58 ± 0.18 | 30.08 ± 1.14 | 0.86 ± 0.07 |
| CCP/ASCCF | 90/10 | 3.44 ± 0.15 | 30.97 ± 1.41[b] | 0.96 ± 0.07[b] |
| CCP/ASCCF/WG | 80/10/10 | 3.62 ± 0.29 | 34.11 ± 1.97[b] | 1.09 ± 0.09[b] |

[a]The mechanical properties were determined by a three-point bending test according to ASTM D790-02 and the dimension of the specimen is about 4 × 0.5 × 0.2 cm.
[b]First failure point on stress-strain curves In general, for indoor applications, particleboards are sometimes nailed for installation, so it is desired to examine the strength of the particleboards during nail driving. The results of the nail-driving test are shown in FIGS. 10A-C. It can be seen that when the nail is driven into the boards, there is substantially no crack on the surface of the CCP/WG and CCP/ASCCF/WG particleboards, while the failure appears in the CCP board (FIG. 10A). As such, WG can bind either CCP or CCP/ASCCF to obtain tougher particleboards. In exemplary embodiments, the nail driving test was performed three times, with the substantially identical results illustrated in FIGS. 10A-C.

Conclusion—Example 2:

The composite particleboard from coconut pith with WG had more desirable mechanical properties than the particleboard without WG. It was also found that the addition of the silane-treated coconut fiber (ASCCF) into the WG-bound particleboard enhances the mechanical properties. This suggests that WG can advantageously replace formaldehyde or the like as a particleboard binder.

EXAMPLE 3

In certain embodiments, the present disclosure provides a process for producing particleboard from coconut coir pith and where coconut fiber is used as a reinforcement, and either wheat gluten or methyl diisocyante is used as a binder. As discussed above, it is again noted that other fibers or lignocellulosic fibers/materials (e.g., tree fibers/materials, bamboo, hemp, cereal straw, rice husks, bagasse, etc.) may be used in lieu of CCF and/or CCP in the systems, processes, methods and examples of the present disclosure.

In exemplary embodiments, the present disclosure relates to using masked isocyanate silane, for example (3-triethoxysilylpropyl)-t-butylcarbamate, to treat natural fibers (e.g., coconut fibers) for producing composite particleboard from lignocellulosic fibers/materials (e.g, coconut coir pith and/or CCF). The present disclosure also relates to using both alkali and the silane treatment of the fiber (CCF). In an exemplary embodiment, the silane used for the treatment is (3-triethoxysilylpropyl)-t-butylcarbamate.

In exemplary embodiments, the fibers were subjected to the alkali treatment first and then by the silane treatment. The present disclosure further relates to the production of the coconut pith particleboard and the coconut pith particleboard reinforced with surface treated coconut fibers.

In exemplary embodiments, the present disclosure provides wheat gluten modified by thiolated additives, and particularly thiolated poly(vinyl alcohol), as a binder for producing the particleboard. In general, the present disclosure provides several environmental advantages. For example, with exemplary formulations, an environmentally friendly binder is utilized (e.g., wheat gluten). Moreover, exemplary composite materials produced according to the present disclosure have improved mechanical properties compared with previous work with wheat gluten as a binder. Furthermore, using thiolated WG binders opens up the development of a whole new family of binders and formulations.

Materials: American vital wheat gluten (WG) was supplied by Arrowhead Mills, USA. It contained about 80% proteins, about 10% water and about 10% starch, and other minor components such as lipids and ash. WG was dried in a vacuum oven at about 50° C. for about 12 hours (moisture content about 3%) before use. Coconut fiber (CCF) and coconut coir pith (CCP) were received from Lanka Coco Products, Ltd., Sri Lanka. (3-triethoxysilylpropyl)-t-butylcarbamate (masked isocyanate silane) was purchased from Gelest Inc., USA. Sodium hydroxide was supplied by Fisher Scientific, USA. Acetone was obtained from J. T. Baker, USA.

Coconut Fiber And Coconut Pith Preparation: Coconut fiber (CCF) with a diameter around 0.30-0.55 mm was cut into about 40 mm lengths and was dried in a vacuum oven at about 50° C. for about 2 hours (moisture content about 3%). Some of the CCF was then subjected to treatments (e.g., fiber surface treatments). Coconut pith (CCP) was sieved to obtain a particle size of <250 μm and dried in a vacuum oven at about 50° C. for about 2-4 hours (moisture content about 10%).

Fiber Treatments:

Alkaline treatment (Mercerization): Samples of dried fibers (CCF) were soaked in: (i) about 2.5%; (ii) about 5%; and (iii) about 10% w/v sodium hydroxide solution in water for about 4 hours at room temperature, then washed thoroughly with distilled water until the rinse solution reached a pH of about 7. The samples of the alkaline-treated fibers (ACCF) were then dried at room temperature for about 12 hours, and then dried in a vacuum oven at about 50° C. for about 2 hours (moisture content about 3%).

Silane treatment: (3-triethoxysilylpropyl)-t-butylcarbamate of about 5 wt %, with respect to the fiber weight, was dissolved in about a 50/50 v/v solution of water and acetone (about 0.1 vol % silane in the solution). The pH was adjusted to about 4 with acetic acid, stirring the solution continuously for about 30 minutes.

Some of the dried (non-alkali treated) CCF, as well as some of the dried alkali-treated fibers (ACCF –2.5%, 5% and 10% NaOH treatment), were then soaked in the silane solution for about 2 hours. The fibers were then removed from the solution, and the solvent was allowed to evaporate in an air stream at room temperature for about 2 hours. The fibers were dried in a vacuum oven at about 50° C. for about 12 hours. The CCF treated with only silane (non-alkali treated) is referred to as SCCF, while the alkali-treated fiber which was also treated with silane is referred to as ASCCF.

Again, it is noted that the present disclosure contemplates that the silane (e.g., masked isocyanate functional silane) may be incorporated/contacted and/or mixed/blended with the fibers, materials, mixtures, blends and/or samples in a variety of ways, and at various different steps in the fabrication process. For example, the silane (MISO) may be incorporated into the sodium hydroxide solution discussed above, and the fibers may be simultaneously soaked in the NaOH and the silane solution, followed by the drying and composite preparation (e.g., mixing/incorporating with binder and/or molding) steps.

Alternatively, the silane (MISO) may be deposited (e.g., via liquid spraying or the like) onto the lignocellulosic fibers/materials (e.g., after the NaOH treatment), and then the silane-treated fibers may be mixed/incorporated with a binder (if desired) and then molded/fabricated. It is noted that the lignocellulosic fibers/materials may be mixed/blended with the binder material (if desired) before, during, or after the silane treatment (e.g., silane treatment via liquid spraying or the like). For example, it is noted that the binder material may be contacted/deposited (e.g., via liquid spraying or the like) onto and/or mixed/blended (e.g., as a liquid or solid) with the lignocellulosic fibers/materials before, during or after the silane treatment (e.g., silane liquid spraying treatment, substantially solid-silane mixing step, and/or after silane solution soaking treatment, etc.).

In certain embodiments, the alkali-treatment step (if desired) may be followed by a silane-treatment step where the MISO silane is mixed/contacted with the other components (e.g., fibers/materials and binder) in substantially one step (e.g., a solids mixing step with MISO/MISO powder and/or binder, and/or a liquid spray treatment step with MISO and/or binder, etc.), followed then by a molding/fabrication step. As noted, the silane-treatment step(s) could have several variations, such as, for example, a silane-treatment step where the components (fibers/materials, MISO silane and/or binder) are mixed/blended together as solids, and/or as a step where the MISO silane and/or binder (if desired) is sprayed onto the lignocellulosic fibers/materials (and other solids) as a liquid.

Composite Particleboard Preparation: Sample bars (about 4×0.5×0.2 cm) of the composites were prepared to examine the mechanical properties. The samples, mixtures (e.g., mechanical mixtures) or blends were compression-molded at about 160° C. for about 20 minutes at about 20 klb$_f$ in a mold to form the bars. Table 7 below lists the approximate weight percent ratios of the various components for the exemplary mixtures/bars/composites.

Mechanical property testing: The molded bars were used for a three-point bending test performed according to ASTM D790-02.

Results and discussion: The bars of the coconut particleboards were prepared to determine the mechanical properties as shown in Table 7.

TABLE 7

Mechanical properties of particleboards based on coconut materials:

| Composites | Ratio (% wt) | Modulus[a] (GPa) | Strength[a] (MPa) | Elongation[a] (%) |
|---|---|---|---|---|
| Coconut Coir Pith (CCP) | 100 | 3.83 ± 0.11 | 31.76 ± 0.98 | 0.86 ± 0.03 |
| CCP/Wheat Gluten (WG) | 95/5 | 3.97 ± 0.16 | 35.51 ± 1.56 | 0.93 ± 0.05 |
| CCP/WG | 90/10 | 3.83 ± 0.10 | 40.57 ± 1.47 | 1.03 ± 0.07 |
| CCP/Alkali washed and silane treated coconut fiber (ASCCF) | 90/10 | 4.38 ± 0.21 | 41.86 ± 1.61[b] | 0.99 ± 0.07[b] |
| CCP/ASCCF/WG | 85/5/10 | 3.95 ± 0.16 | 41.13 ± 1.61[b] | 1.07 ± 0.06[b] |
| CCP/ASCCF/WG | 80/10/10 | 4.00 ± 0.14 | 45.60 ± 1.58[b] | 1.09 ± 0.10[b] |
| CCP/Huntsman Rubinate methyl diisocyanate binder (RN) | 95/5 | 3.75 ± 0.11 | 43.44 ± 1.88 | 1.22 ± 0.14 |
| CCP/RN | 90/10 | 3.59 ± 0.12 | 46.28 ± 1.75 | 1.33 ± 0.06 |
| CCP/ASCCF/RN | 85/5/10 | 3.69 ± 0.10 | 47.87 ± 2.07[b] | 1.34 ± 0.04[b] |
| CCP/ASCCF/RN | 80/10/10 | 3.51 ± 0.09 | 50.78 ± 1.86[b] | 1.48 ± 0.08[b] |

[a]The mechanical properties were determined by a three-point bending test according to ASTM D790-02 and the dimension of the specimen is 4 × 0.5 × 0.2 cm.
[b]First failure point on stress-strain curves

EXAMPLE 4

In exemplary embodiments, formaldehyde-free particleboard was prepared based on coconut pith (CCP) with three different binders: wheat gluten ("WG"), commercial polyisocyanate (RUBINATE®1780, or "RN"), and commercial polyurethane ("PU").

As noted below, the mechanical and physical properties of the eco-particleboards have been examined. More particularly, the mechanical properties of the WG-bound particleboard is compared with those of particleboards using two commercial binders: RUBINATE®1780 (RN), which is a water-compatible polyisocyanate based on diphenylmethane diisocyanate, and a polyurethane binder (PU) based on palm oil polyol.

As discussed further below, alkali-treated fiber, followed by silane-treated coconut fiber (ASCCF) at about 10 wt % fiber was used to reinforce the particleboards. As discussed below, small bar samples were prepared to determine results for mechanical properties (e.g., evaluation by a three-point bending test). The effects of molding pressure, binder type, and binder content on the mechanical properties were also investigated.

The modulus of elasticity ("MOE"), the modulus of rupture ("MOR"), tensile strength parallel to surface ("TS"), water absorption ("WA %"), thickness swelling ("TSW %"), and thermal stability of the particleboards were also investigated. Additionally, the MOE and MOR of the boards were also compared with the minimum MOE and MOR requirements for commercial particleboard products as specified by the American National Standard Institute (ANSI), in ANSI A208.1-1999 for particleboard.

Materials: The coconut fiber (CCF) and coconut coir pith (CCP) were received from Lanka Coco Products, Ltd., Sri Lanka. The American vital wheat gluten (WG) was supplied by Arrowhead Mills, USA. It contained about 80% proteins, about 10% water and about 10% starch, along with other minor components such as lipids and ash. The WG was dried in a vacuum oven at about 50° C. for about 12 hours (moisture content about 3%) before use.

RUBINATE®1780 ("RN"), a methylene diphenyl diisocyanate binder, was supplied by Huntsman Polyurethanes, USA. Polyurethane binder ("PU") was received from AURA P. U. TECH (M) SDN BHD, Malaysia. The PU binder includes two parts: (i) AURATHANE@BR10, a palm oil-based polyol, and (ii) AURANATE@BH10, a polyisocyanate hardener for the palm oil-based polyol binder.

(3-triethoxysilylpropyl)-t-butylcarbamate (masked isocyanate silane or MISO) was purchased from Gelest Inc., USA. The sodium hydroxide was supplied by Fisher Scientific, USA. Acetone was obtained from J. T. Baker, USA.

It is again noted that other fibers or lignocellulosic fibers/materials may be used in lieu of CCF and/or CCP in the systems, processes, methods and examples of the present disclosure.

Coconut Fiber and Coconut Pith Preparation:

Coconut fiber (CCF) with a diameter in the range from about 0.30 mm to about 0.55 mm was cut into about 40 mm lengths and was dried in a vacuum oven at about 50° C. for about 2 hours (moisture content about 3%). Some of the CCF was then subjected to surface treatments.

Coconut pith (CCP) was sieved to obtain a particle size of <250 μm and dried in a vacuum oven at about 50° C. for about 2-4 hours (moisture content about 10%) before preparing composite samples.

It is noted that for composites containing the PU binder, excessive moisture content of the materials might affect the PU binder performance. More particularly, the recommended moisture content of materials used with the PU binder is less than about 5% moisture content. Thus, the CCP for use with the PU binder was dried in a vacuum oven at about 50° C. for about 8-10 hours to obtain a lower moisture content (e.g., moisture content less than about 5%).

Fiber Treatments:

Alkali Treatment (Mercerization):

Samples of dried fibers (CCF) were soaked in about 5% w/v sodium hydroxide solution in water for about 4 hours at room temperature, then washed thoroughly with distilled water until the rinse solution reached a pH of about 7. Each batch of alkaline-treated fibers was then dried at room temperature for about 12 hours, and then dried in a vacuum oven at about 50° C. for about 2 hours (moisture content about 3%).

Silane Treatment:

(3-triethoxysilylpropyl)-t-butylcarbamate of about 5 weight %, with respect to the fiber weight, was dissolved in about a 50/50 v/v solution of water and acetone (about 0.1 volume % silane in the solution). The pH was adjusted to about 4 with acetic acid, stirring the solution continuously for about 30 minutes.

Some of the dried alkali-treated (5% NaOH) coconut fibers were then soaked in the silane solution for about 2 hours. The fibers were then removed from the solution, and the solvent was allowed to evaporate in an air stream at room temperature for about 2 hours. The fibers were then dried in a vacuum oven at about 50° C. for about 12 hours. The alkali-followed by silane-treated fiber is referred to as ASCCF. Some of the ASCCF was utilized to prepare composite samples, as discussed further below.

As discussed above in conjunction with Example 1, the interaction of the silane treatment with the fiber surface was examined with X-Ray Photoelectron Spectroscopy (XPS) and Gas Chromatography/Mass Spectroscopy (GC/MS) to verify the deposition of the silane on the fiber surface and the demasking reaction that converts the carbamate to isocyanate at the particleboard consolidation temperature.

Again, it is noted that the present disclosure contemplates that the silane (e.g., masked isocyanate functional silane) may be incorporated/contacted and/or mixed/blended with the fibers, materials, mixtures, blends and/or samples in a variety of ways, and at various different steps in the fabrication process. For example, the silane (MISO) may be incorporated into the sodium hydroxide solution discussed above, and the fibers may be simultaneously soaked in the NaOH and the silane solution, followed by the drying and composite preparation (e.g., mixing/incorporating with binder and/or molding) steps.

Alternatively, the silane (MISO) may be deposited (e.g., via liquid spraying or the like) onto the lignocellulosic fibers/materials (e.g., after the NaOH treatment), and then the silane-treated fibers may be mixed/incorporated with a binder (if desired) and then molded/fabricated. It is noted that the lignocellulosic fibers/materials may be mixed/blended with the binder material (if desired) before, during, or after the silane treatment (e.g., silane treatment via liquid spraying or the like). For example, it is noted that the binder material may be contacted/deposited (e.g., via liquid spraying or the like) onto and/or mixed/blended (e.g., as a liquid or solid) with the lignocellulosic fibers/materials before, during or after the silane treatment (e.g., silane liquid spraying treatment, substantially solid-silane mixing step, and/or after silane solution soaking treatment, etc.).

In certain embodiments, the alkali-treatment step (if desired) may be followed by a silane-treatment step where the MISO silane is mixed/contacted with the other components (e.g., fibers/materials and binder) in substantially one step (e.g., a solids mixing step with MISO/MISO powder and/or binder, and/or a liquid spray treatment step with MISO and/or binder, etc.), followed then by a molding/fabrication step. As noted, the silane-treatment step(s) could have several variations, such as, for example, a silane-treatment step where the components (fibers/materials, MISO silane and/or binder) are mixed/blended together as solids, and/or as a step where the MISO silane and/or binder (if desired) is sprayed onto the lignocellulosic fibers/materials (and other solids) as a liquid.

Preparation of Composite Samples:

In exemplary embodiments, two different types/sizes of composite samples were prepared: (i) smaller bars (e.g., bars of about 4 cm×0.5 cm) and, (ii) larger boards (e.g., boards of about 21 cm×14 cm×0.4 cm).

For the small bars, the mixtures, blends, samples or composites of: (i) CCP, (ii) CCP/ASCCF, (iii) CCP/binder, and (iv) CCP/ASCCF/binder were prepared to examine the mechanical properties. The formulations/blends/mixtures used to prepare the small bars of the exemplary composites are presented in Table 8 below. As such, Table 8 below lists the approximate weight percent ratios of the various components for the exemplary small bars/composites.

For the composites/bars containing/including the RN or PU binders, acetone was mixed with these binders to reduce their viscosity. In general, the ratio of the binder (RN or PU) to acetone for preparation of the binder solution was about 1:2 wt/vol. The binder solution and the CCP were then mechanically mixed for about 5 minutes. For the composites/bars containing/including the WG binder, the WG was mechanically mixed with the CCP for about 5 minutes without adding acetone.

In exemplary embodiments, the amount of ASCCF in the coconut pith composites for the small bars and the larger boards was constant at about 10 wt %, with respect to total weight of composites (Tables 8-10 and 12). For the composites reinforced with ASCCF, the fibers were substantially unidirectionally aligned in each mold for the small bars, whereas the fibers (ASCCF) were placed into each mold in a randomly oriented manner for the larger boards.

In order to prepare the small bars, each sample/mixture/blend (about 700 mg total for each sample/mixture) of CCP, CCP/ASCCF, CCP/binder (e.g., binder is WG, RN or PU), or CCP/ASCCF/binder was compression-molded to form a bar/composite (each bar about 4 cm×0.5 cm) in a multi-cavity stainless steel mold at about 160° C. at two different molding forces: (i) at about $4.0 \times 10^3$ N (900 $lb_f$) and, (ii) at about $8.9 \times 10^4$ N (20,000 $lb_f$), corresponding to pressure of about $4.0 \times 10^6$ N/m$^2$ and about $8.9 \times 10^7$ N/m$^2$, respectively.

Five bars were prepared/fabricated at each molding force for each different sample/mixture/blend of CCP, CCP/ASCCF, CCP/binder, or CCP/ASCCF/binder. The thickness of the bars after compression molding at about $4.0 \times 10^6$ N/m$^2$ and at about $8.9 \times 10^7$ N/m$^2$ was about 0.35 cm and about 0.2 cm, respectively.

For the larger boards, each sample/mixture/blend (about 105 g for each sample/mixture) of CCP, CCP/ASCCF/WG, CCP/ASCCF/RN, or CCP/ASCCP/PU was compression-molded at about 160° C. to form each board. It is noted that in order to prepare the larger boards at the same pressures (at about $4.0 \times 10^6$ and $8.9 \times 10^7$ N/m$^2$) used for molding the small bars, compression forces of about $1.3 \times 10^5$ N (30,000 $lb_f$) and about $2.7 \times 10^6$ N (616,000 $lb_f$) should be applied.

However, the exemplary hot-press used was capable of a maximum compression force of about $2 \times 10^5$ N. Therefore, the larger boards were prepared at just one compression pressure, $4.0 \times 10^6$ N/m$^2$. The dimensions of the larger boards after compression molding were about 21 cm×14 cm×0.4 cm. Molding time to prepare small bars and larger boards was about 20 minutes, except for those cases where the composites contained/included PU binder, where about 7 minutes of molding time was utilized.

TABLE 8

The composite components used to prepare small bars:

| Composites | Ratio (% wt) |
| --- | --- |
| CCP | 100 |
| CCP/ASCCF | 90/10 |
| CCP/WG | 95/5, and 90/10 |
| CCP/RN | 95/5, and 90/10 |
| CCP/PU$^a$ | 90/10 |
| CCP/ASCCF/WG | 85/10/5, and 80/10/10 |
| CCP/ASCCF/RN | 85/10/5, and 80/10/10 |
| CCP/ASCCF/PU$^a$ | 80/10/10 |

$^a$In the case of the PU binder, about 10-15 wt % of the binder with respect to total weight of the composites was recommended to bind the coconut fiber and pith. Thus, only about 10 wt % of PU binder was used to prepare those composites.

Analytical Techniques:

Mechanical Property Testing:

The molded bars were used for a three-point bending test performed according to the standard test methods for flexural properties of unreinforced and reinforced plastics and electrical insulating materials, ASTM D790-02. The molded specimens were kept in a desiccator containing Drierite® desiccant (about 30% relative humidity) for at least 3 days before testing. The tests were conducted on a computer-interfaced Instron 1011 with about a 50 N load cell. The rate of crosshead motion was about 1 mm/min, while the data acquisition rate was about 10 points per second. Four replicates were performed for each composite.

In the case of the larger boards, modulus of rupture ("MOR"), modulus of elasticity ("MOE") and tensile strength parallel to surface ("TS") were measured according to the standard test methods for evaluating properties of wood-based fiber and particle panel materials, ASTM D1037-99 using the Instron 1011. The specimens were kept in the desiccator for at least 3 days before the measurements of MOR, MOE and TS. For MOR and MOE measurements, about a 500 N load cell was used with a rate of crosshead motion of about 2 mm/min. For the TS measurements, about a 500N load cell was used for the CCP, CCP/ASCCF/WG and CCP/ASCCF/PU composites, and about a 5 kN load cell was used for the CCP/ASCCF/RN composites, both with a rate of crosshead motion of about 4 mm/min. Three to five specimens were tested for each composite.

Nail-Driving Test:

This test was performed to examine the toughness of the boards when nails were driven through them. The fabricated/manufactured CCP, CCP/ASCCF/WG, CCP/ASCCF/RN, and CCP/ASCCF/PU larger boards were cut to about 5×5 cm (2×2 inch) size. Nails of about 2.18 mm in diameter were driven into the boards substantially perpendicular to the plane at the center of the boards. Twenty replicates were performed for each type from five boards. The number of samples that cracked or otherwise failed, and the description of the failures are reported below.

Water Absorption and Thickness Swelling of Particleboard:

The water absorption ("WA") and thickness swelling ("TSW") tests of the larger boards were carried out according to ASTM D1037-99. The method A: 2 plus about 22-hour submersion period in water was used for the testing to provide information on the short term and longer term WA and TSW values. The specimens were cut to about 5×5 cm (2×2 inch) from the larger boards and then conditioned in a chamber containing a saturated magnesium nitrate solution at about 20° C. for about 48 hours to maintain a relative humidity of about 55%. Three specimens from each of three different larger boards were used for the testing. The WA and TSW values are expressed as a percent for the specimens after about 2 hours, and after an additional period of about 22 hours submersion. The percentage of WA and TSW was calculated as follows:

WA (%)=[($W_s-W_0$)/$W_0$]×100     (Equation 1)

TSW (%)=[($T_s-T_0$)/$T_0$]×100     (Equation 2)

where $W_s$ and $T_s$ are weight and thickness of a specimen after submersion, respectively. $W_0$ and $T_0$ are initial weight and thickness of a specimen before submersion, respectively.

All specimens were horizontally submerged in distilled water maintained at a temperature of about 20° C. After about a 2 hour submersion, each specimen was removed from the water and put on a plastic rack to remove the excess surface water for about 10 minutes. At the end of this time, the weight and thickness of the specimen was immediately measured. Then, the specimen was submerged in fresh water for an additional period of about 22 hours, and the above procedure for removing excess water, weighing and measuring was repeated.

Thermo-gravimetric Analysis (TGA):

TGA was used to investigate thermal decomposition of the prepared larger particleboards. TGA was performed on a TA Instruments Hi-Res 2950 instrument equilibrated at about 60° C., followed by a ramp to about 800° C. at about 20° C./minute in air with a flow rate of about 60 mL/min.

Results and Discussion:

Mechanical Property of Small Bar Composites:

To investigate the effect of compression pressure on the mechanical properties, the small molded bars of the composites were prepared at two different molding pressures: about $4.0 \times 10^6$ N/m² (molding condition #1), and about $8.9 \times 10^7$ N/m² (molding condition #2). A comparison of the mechanical properties of CCP, CCP/ASCCF, CCP/binder, and CCP/ASCCF/binder composites are summarized in Table 9 below. The first failure stress values are the stresses at which the WG matrix began to crack, and are illustrated in FIGS. 11A-H (arrow sign). Without a binder, it is noted that the modulus (GPa) of the substantially pure CCP molded at the higher pressure of $8.9 \times 10^7$ N/m² (molding condition #2) increased by about 7 times compared to the CCP at molding condition #1, and that the strength (MPa) of the CCP at molding condition #2 increased by about 9 times compared with the CCP molded at the lower pressure of $4.0 \times 10^6$ N/m² (molding condition #1—Table 9 below). These large changes are most likely the result of high lignin and phenolic content (about 45%) in coconut pith, and at temperatures above about 140° C., the lignin and phenolic substances can melt and act like a thermosetting adhesive. Thus, they might act as an intrinsic resin adhesive, resulting in an increase in the modulus and strength at the higher molding pressure.

As shown in Table 9, the modulus (GPa) and strength (MPa) of all the composites relative to one another prepared at the higher compression pressure (molding condition #2) significantly increased compared with those consolidated with lower pressure (molding condition #1). However, the elongation of all molded composites relative to one another decreased at the higher compression pressure (Table 9).

The effect of binder content on the mechanical properties of the fabricated particleboards/composites was also evaluated. Two different binder loadings were used, about 5 wt % and about 10 wt %, with respect to total weight of composites (Table 9).

In all cases, the composites with 10 wt % binder content provided superior results for strength and elongation compared to the composites consolidated with 5 wt % binder content. The effect of binder content on the modulus was not as significant, but the composites with 10 wt % binder generally had greater than or equal modulus values than the corresponding composites with 5 wt % binder.

The addition of the ASCCF into the CCP, CCP/WG, CCP/RN or CCP/PU enhanced the mechanical properties of the composites compared with the corresponding composites without ASCCF (Table 9). Thus, the ASCCF played a role as reinforcement in the composites, thereby improving the mechanical properties of the composites. Among the three binders tested, the composites with RN binder had the most desirable properties in most cases. However, the CCP/ASCCF/PU binder had a very graceful failure mode, achieving very similar maximum strength as the CCP/ASCCF/RN composite, but with greater ductility.

FIGS. 11A-H show the stress-strain curves of the small bar composites, which were compressed at about 160° C. with about $8.9 \times 10^7$ N/m² for about 20 minutes, except for the CCP/PU and CCP/ASCCF/PU composites, where a molding time of about 7 minutes was used. There was substantially no ductile behavior in the stress-strain curves of the binderless CCP, CCP/WG, CCP/RN, and CCP/PU, while the composites reinforced with ASCCF either with or without a binder showed ductile failure behavior. In the composites reinforced with ASCCF, the first failure is indicated by an arrow, and in several cases the maximum failure is at higher stress and larger strain.

TABLE 9

Mechanical properties of small bars based on coconut materials:

| Composite type (Ratio, % wt) | Molding condition #1[a,b] (molding pressure = 4.0 × 10⁶ N/m²) | | | Molding condition #2[a,b] (molding pressure = 8.9 × 10⁷ N/m²) | | |
|---|---|---|---|---|---|---|
| | Modulus (GPa) | First failure stress (Max. stress) (MPa) | Elongation (%) | Modulus (GPa) | First failure stress (Max. stress) (MPa) | Elongation (%) |
| CCP (100) | 0.57 ± 0.08 | 3.71 ± 0.27 (3.71 ± 0.27) | 1.00 ± 0.17 (1.00 ± 0.17) | 3.83 ± 0.11 | 31.76 ± 0.98 (31.76 ± 0.98) | 0.86 ± 0.03 (0.86 ± 0.03) |
| CCP/ASCCF (90/10) | 0.65 ± 0.05 | 12.25 ± 0.62 (14.34 ± 1.73) | 2.33 ± 0.11 (3.06 ± 0.18) | 3.91 ± 0.59 | 40.05 ± 1.11 (41.89 ± 1.16) | 0.88 ± 0.10 (4.32 ± 0.20) |
| CCP/WG (95/5) | 0.87 ± 0.09 | 6.05 ± 0.72 (6.05 ± 0.72) | 1.00 ± 0.10 (1.00 ± 0.10) | 3.44 ± 0.15 | 30.97 ± 1.41 (30.97 ± 1.41) | 0.96 ± 0.07 (0.96 ± 0.07) |

TABLE 9-continued

Mechanical properties of small bars based on coconut materials:

| Composite type (Ratio, % wt) | Molding condition #1[a,b] (molding pressure = 4.0 × 10^6 N/m²) | | | Molding condition #2[a,b] (molding pressure = 8.9 × 10^7 N/m²) | | |
|---|---|---|---|---|---|---|
| | Modulus (GPa) | First failure stress (Max. stress) (MPa) | Elongation (%) | Modulus (GPa) | First failure stress (Max. stress) (MPa) | Elongation (%) |
| CCP/WG (90/10) | 1.20 ± 0.08 | 9.20 ± 1.38 (9.20 ± 1.38) | 1.07 ± 0.07 (1.07 ± 0.07) | 3.83 ± 0.10 | 40.57 ± 1.47 (40.57 ± 1.47) | 1.03 ± 0.07 (1.03 ± 0.07) |
| CCP/RN (95/5) | 1.76 ± 0.09 | 25.09 ± 1.11 (25.09 ± 1.11) | 1.48 ± 0.05 (1.48 ± 0.05) | 3.75 ± 0.11 | 43.44 ± 1.88 (43.44 ± 1.88) | 1.22 ± 0.14 (1.22 ± 0.14) |
| CCP/RN (90/10) | 2.13 ± 0.10 | 38.87 ± 1.86 (38.87 ± 1.86) | 1.76 ± 0.08 (1.76 ± 0.08) | 3.59 ± 0.12 | 46.28 ± 1.75 (46.28 ± 1.75) | 1.33 ± 0.06 (1.33 ± 0.06) |
| CCP/PU (90/10) | 1.13 ± 0.06 | 14.25 ± 0.80 (14.25 ± 0.80) | 1.37 ± 0.05 (1.37 ± 0.05) | 3.03 ± 0.11 | 30.62 ± 1.37 (30.62 ± 1.37) | 1.06 ± 0.04 (1.06 ± 0.04) |
| CCP/ASCCF/WG (85/10/5) | 1.29 ± 0.09 | 14.50 ± 0.91 (17.84 ± 1.69) | 1.75 ± 0.13 (3.10 ± 0.15) | 3.95 ± 0.16 | 41.13 ± 1.61 (43.38 ± 1.84) | 1.07 ± 0.06 (3.56 ± 0.09) |
| CCP/ASCCF/WG (80/10/10) | 1.45 ± 0.12 | 22.07 ± 0.85 (27.11 ± 1.99) | 1.94 ± 0.34 (3.25 ± 0.17) | 4.00 ± 0.14 | 45.60 ± 1.58 (47.25 ± 2.01) | 1.09 ± 0.10 (4.09 ± 0.12) |
| CCP/ASCCF/RN (85/10/5) | 2.05 ± 0.10 | 28.02 ± 1.56 (36.68 ± 2.19) | 1.52 ± 0.20 (2.32 ± 0.26) | 3.69 ± 0.10 | 47.87 ± 2.07 (47.87 ± 2.07) | 1.34 ± 0.04 (1.34 ± 0.04) |
| CCP/ASCCF/RN (80/10/10) | 2.21 ± 0.10 | 32.86 ± 1.08 (41.20 ± 1.22) | 1.87 ± 0.18 (1.57 ± 0.15) | 3.51 ± 0.09 | 50.78 ± 1.86 (50.78 ± 1.86) | 1.48 ± 0.08 (1.48 ± 0.08) |
| CCP/ASCCF/PU (80/10/10) | 1.40 ± 0.13 | 24.98 ± 2.30 (34.27 ± 0.27) | 1.83 ± 0.10 (6.36 ± 0.37) | 3.26 ± 0.11 | 40.29 ± 1.29 (51.73 ± 2.15) | 1.45 ± 0.16 (5.73 ± 0.22) |

[a]Molding condition: about 160° C., at about 20 minutes, except for composites having PU binder where molding time of about 7 minutes was used.
[b]A plus/minus value (±) is a sample standard deviation. Five specimens were prepared from one pressing in the same mold.

Mechanical Property of Larger Boards:

The modulus of rupture ("MOR"), modulus of elasticity ("MOE"), and tensile strength parallel to the surface ("TS") were measured by ASTM D1037-99. The measurements for CCP, CCP/ASCCF/WG, CCP/ASCCF/RN, and CCP/AS-CCF/PU boards prepared at about 160° C. with about 4.0× 10^6 N/m² compression pressure are presented in Table 10 below. This compression pressure substantially matches molding condition #1 for the small bars. The boards with fiber and binder all contained about 10 wt % fiber and about 10 wt % binder, and were consolidated for about 20 minutes, except for CCP/ASCCF/PU composites, where about 7 minutes consolidation was used. It can be seen that CCP/ASCCF/RN particleboard had the highest mechanical properties compared with others, which is in agreement with the mechanical property results found in the small bar composites where the RN-bound composites showed better mechanical properties than WG- and PU-bound composites. Interestingly, the mechanical properties of the WG-bound particleboard were comparable to those of the board prepared with the commercial PU binder.

The MOE and MOR of manufactured particleboards were also compared with the minimum requirements of mechanical properties (MOE and MOR) for commercial particleboard manufacturing, which is specified by the American National Standard Institute (ANSI), ANSI A208.1-1999 for particleboard. In the ANSI Standard A208.1, the particleboard grades are identified by a letter designation, followed by a hyphen and a digit or letter. The first letter designation indicates density classes. For instance, the letter "H" means high density (generally above 800 kg/m³), "M" means medium density (generally between 640-800 kg/m³), and "L" means low density (generally less than 640 kg/m³). The second digit designation indicates the grade identification within a particular density or product description.

The particleboards listed in Table 10 were compared to the medium density (M) particleboard standard, even though the density of WG/ASCCF/RN was slightly above 800 kg/m³. Table 11 below represents general use and grades of the medium density particleboards, as well as mechanical property (MOE and MOR) requirements for the particleboard according to the ANSI A208.1.

TABLE 10

The density and mechanical properties of the CCP-based particleboards:

| Particleboard type | Board density (kg/m³) | Formulation (wt %) | MOE[a] (GPa) | MOR[a] (MPa) | TS[b] (MPa) |
|---|---|---|---|---|---|
| CCP | 756 ± 16 | 100 | 0.28 ± 0.14 | 1.4 ± 0.10 | 0.77 ± 0.15 |
| CCP/ASCCF/WG | 797 ± 5 | 80/10/10 | 0.68 ± 0.10 | 7.8 ± 1.13 | 2.93 ± 0.17 |
| CCP/ASCCF/RN | 810 ± 8 | 80/10/10 | 1.73 ± 0.49 | 13.1 ± 2.15 | 6.00 ± 0.17 |
| CCP/ASCCF/PU | 788 ± 10 | 80/10/10 | 0.75 ± 0.20 | 6.8 ± 0.43 | 3.10 ± 0.37 |

[a]MOE is modulus of elasticity, MOR is modulus of rupture which is maximum stress.
[b]For tensile strength (TS), dog-bone samples cut from the larger boards were used.

TABLE 11

General use, grades, and mechanical property requirements for medium density particleboards according to the ANSI A208.1:

| Grade | MOE (GPa) | MOR (MPa) | General use |
|---|---|---|---|
| M-1 | 1.725 | 11.0 | Commercial |
| M-S | 1.900 | 12.5 | Commercial |
| M-2 | 2.250 | 14.5 | Industrial |
| M-3 | 2.750 | 16.5 | Industrial and interior stair tread |

FIGS. 12A-B show MOE (FIG. 12A) and MOR (FIG. 12B) of CCP, CCP/ASCCF/WG, CCP/ASCCF/RN, and CCP/ASCCF/PU particleboards compared with the minimum requirement of MOR and MOE for the M−1 particleboard according to the ANSI A208.1. The horizontal solid lines indicate the minimum MOE (1.725 GPa), and MOR (11.0 MPa) requirements for the M−1 grade particleboard, respectively. From FIGS. 12A-B, the CCP, CCP/ASCCF/WG, and CCP/ASCCF/PU boards did not meet the minimum requirement of MOE and MOR. However, the CCP/ASCCF/RN board did meet the minimum requirements for MOE and MOR of M−1 grade particleboard.

The mechanical properties of the small bars and the larger particleboards determined according to ASTM D790-02 and ASTM D1037-99, respectively, are summarized in Table 12 below. The small bars molded at the higher pressure ($8.9 \times 10^7$ N/m$^2$) had modulus and strength at least 1.5 times higher than the ones pressed at the lower pressure ($4.0 \times 10^6$ N/m$^2$). Therefore, it is reasonable to predict that if the larger particleboards were molded at the higher pressure, superior results for the mechanical properties (MOE and MOR) would also be obtained.

Nail-Driving Test:

For certain applications (e.g., indoor applications), particleboards are nailed for installation. Thus, the behavior of the particleboards during nail driving was examined. Qualitative tests were performed, and the number of failed particleboards is reported in Table 13 below.

Additionally, FIGS. 13A-H show particleboard images after the nail-driving test. In the case of boards without the addition of ASCCF, 85% of the binderless CCP boards failed. In the CCP/WG and CCP/RN boards at the ratio of 90/10 by weight, the percentage of failures is 10% and 15%, respectively. In failed CCP boards, the boards broke, or the surface of the boards peeled in flakes as illustrated in FIGS. 13A and 13B. The CCP/WG boards that failed broke, but did not substantially peel (FIG. 13C). In the case of CCP/RN boards, the failure of the boards was primarily due to brittleness (FIG. 13D). It is believed that the addition of the high percentage of the RN binder made the boards too brittle. Generally, the amount of the methyl diisocyante ("MDI")-based isocyanate binder used in production of particleboards is less than about 10%, preferably about 6%. See, e.g., U.S. Pat. No. 6,692,670, the entire contents of which is hereby incorporated by reference in its entirety.

In the CCP/PU boards, no failures were observed. No failures were observed in any of the boards reinforced with ASCCF.

TABLE 12

Mechanical properties of the small bars and larger particleboards investigated according to ASTM D790-02 and ASTM D1037-99:

| | Molding condition #1 (molding pressure = $4.0 \times 10^6$ N/m$^2$) | | | | Molding condition #2 (molding pressure = $8.9 \times 10^7$ N/m$^2$) | |
|---|---|---|---|---|---|---|
| | Small bar | | Larger particleboard | | Small bar | |
| Composite type (Ratio, % wt) | Modulus[a] (GPa) | Maximum Strength[a] (MPa) | MOE[b] (GPa) | MOR[b] (MPa) | Modulus[a] (GPa) | Maximum Strength[a] (MPa) |
| CCP (100) | 0.57 ± 0.08 | 3.71 ± 0.27 | 0.28 ± 0.13 | 1.37 ± 0.19 | 3.83 ± 0.11 | 31.76 ± 0.98 |
| CCP/WG (90/10) | 1.20 ± 0.08 | 9.20 ± 1.38 | — | — | 3.83 ± 0.10 | 40.57 ± 1.47 |
| CCP/RN (90/10) | 2.13 ± 0.10 | 38.87 ± 1.86 | — | — | 3.59 ± 0.12 | 46.28 ± 1.75 |
| CCP/PU (90/10) | 1.13 ± 0.06 | 14.25 ± 0.80 | — | — | 3.03 ± 0.11 | 30.62 ± 1.37 |
| CCP/ASCCF/WG (80/10/10) | 1.45 ± 0.12 | 27.11 ± 1.99 | 0.68 ± 0.10 | 7.78 ± 1.13 | 4.00 ± 0.14 | 47.25 ± 2.01 |
| CCP/ASCCF/RN (80/10/10) | 2.21 ± 0.10 | 41.20 ± 1.22 | 1.73 ± 0.49 | 13.10 ± 2.15 | 3.51 ± 0.09 | 50.78 ± 1.86 |
| CCP/ASCCF/PU (80/10/10) | 1.40 ± 0.13 | 34.27 ± 0.27 | 0.75 ± 0.20 | 6.82 ± 0.43 | 3.26 ± 0.11 | 51.73 ± 2.15 |

[a]Mechanical properties of small bars investigated by a three-point bending test performed according to the ASTM D790-02.
[b]Mechanical properties of larger particleboards investigated by a bending test performed according to the ASTM D1037-99.

TABLE 13

Number of failed particleboards after the nail-driving test:

| Particleboard type | Number of tested samples | Number of failed samples | Failure percent (%) |
|---|---|---|---|
| CCP | 20 | 17 | 85 |
| CCP/WG | 20 | 2 | 10 |
| CCP/RN | 20 | 3 | 15 |
| CCP/PU | 20 | 0 | 0 |
| CCP/ASCCF/WG | 20 | 0 | 0 |
| CCP/ASCCF/RN | 20 | 0 | 0 |
| CCP/ASCCF/PU | 20 | 0 | 0 |

Water Absorption and Swelling Characteristics of the Particleboard:

The water absorption and the thickness swelling of particleboards generally are important properties for evaluating their stability compared to realistic conditions during construction and subsequent usage. The water absorption (WA) and thickness swelling (TSW) of CCP/ASCCF/WG, CCP/ASCCF/RN, and CCP/ASCCF/PU boards were evaluated in terms of percentage values calculated by equations (1), and (2) above, respectively. The results of the percent water absorption (% WA) and thickness swelling (% TSW) are given in Table 14.

TABLE 14

Water absorption and thickness swelling of the particleboard:

| Particleboard type | Percent water absorption (% WA) | | Percent thickness swelling (% TSW) | |
|---|---|---|---|---|
| | After 2 h | After 24 h | After 2 h | After 24 h |
| CCP/ASCCF/WG | 110.82 ± 6.51 | 135 ± 3.84 | 51.03 ± 2.37 | 59.40 ± 4.18 |
| CCP/ASCCF/RN | 13.97 ± 1.34 | 38.89 ± 1.74 | 9.34 ± 1.38 | 15.53 ± 1.91 |
| CCP/ASCCF/PU | 17.07 ± 2.08 | 42.21 ± 1.15 | 11.20 ± 1.46 | 18.01 ± 1.21 |

The WA and TSW of CCP board could not evaluated because when the CCP specimen was soaked in water, it gradually decomposed into CCP particles, primarily due to the absence of binder. From Table 14, it can be seen that the particleboard using the WG binder provided the greatest values in % WA and % TSW in both short (2 hour) and long (2 plus 22 hour) terms of submersion. In the case of CCP/ASCCF/RN and CCP/ASCCF/PU, the % WA and % TSW values were comparable, and were much lower than those in the WG bonded particleboard.

Lignocellulosic materials such as coconut pith and coconut fiber consist of cellulose, hemicelluloses, and lignin, where there are large numbers of hydroxyl groups (—OH). These hydrophilic materials typically absorb large amounts of water and consequently swell. However, a high degree of reaction between a binder and the hydroxyl groups in the lignocellulosic materials can potentially reduce the water absorption and swelling by making the material more hydrophobic. In the case of the RN binder, isocyanate groups have high reactivity with hydroxyl groups of CCP. The PU binder consisting of polyol and polyisocyanate hardener can react with itself and the OH groups to form a crosslinked structure with the CCP. The WG binder consists mainly of proteins that absorb water. As a result, the RN- and PU-bound particleboards have much lower % WA and % TSW than the WG-bound particleboard.

Thermo-gravimetric Analysis (TGA):

The thermal stability of particleboards generally is an important property for evaluating fire resistance. TGA was used to investigate the thermal decomposition temperature of the particleboards. Weight loss and corresponding first derivative of weight loss thermogram (DTG) curves of the composites are shown in FIG. 14. Table 15 also presents thermal decomposition temperature ($T_d$) at 5 wt % loss and temperature of maximum decomposition rate ($T_p$) at the second step of decomposition in DTG curves. The TGA curves of the particleboards showed a similar pattern, where there are four main weight-loss stages. The first stage with a slight weight loss below about 130° C. of the particleboards was caused by evaporation of absorbed water in the boards. In general, three main degradation stages can be attributed to pyrolysis and evaporation of the pyrolytic products.

From Table 15, the CCP-based particleboards glued with the binders provided higher $T_d$ and $T_p$ than the binderless CCP particleboard because a presence of chemical bonding between the binders and either CCP or ASCCF. Among the three types of binders, the RN-bound particleboard showed the highest thermal stability on account of a high degree of reaction between isocyanate groups of the RN binder and hydroxyl groups on the surface of CCP or ASCCF.

TABLE 15

Thermal decomposition temperature ($T_d$) and temperature of maximum decomposition rate ($T_p$) of the composites:

| Composite type | $T_d$ at 5 wt % loss (° C.) | $T_p$ at the second step of decomposition (° C.) |
|---|---|---|
| CCP | 134.1 | 269.7 |
| CCP/WG | 197.2 | 280.2 |
| CCP/RN | 229.7 | 305.2 |
| CCP/PU | 198.0 | 289.8 |

Conclusions:

The small bars of CCP, and WG-, RN-, and PU-bound CCP composites were prepared to investigate the effects of molding pressure, binder content and binder type on the mechanical properties. It is noted that excellent properties were obtained with high pressure molded bars. It was also found that the addition of the ASCCF at about 10 wt % fiber into the larger particleboards bound with binders enhanced the mechanical properties. At high binder content, the properties of composites with or without ASCCF improved. Among the three binders, RN generally had the most desirable mechanical properties. Compared with the CCP composite bars with the commercial PU, the WG-bound CCP bars provided comparable or higher mechanical properties. As such, the WG has a potential to be a promising binder for particleboard production.

The ASCCF-reinforced CCP particleboard bound with RN binder showed better mechanical (MOE, MOR, and TS) and physical (WA % and TSW %) properties, as well as thermal stability than those bound with WG and PU. At the low molding pressure, the CCP/ASCCF/RN particleboard met the minimum MOE and MOR requirements for M-1 grade particleboard according to the ANSI A208.1-1999. From the preliminary mechanical property results of small bar composites molding at the high pressure, which showed an increase in the mechanical properties, it is expected that it is possible that the properties CCP/ASCCF/WG and CCP/ASCCF/PU pressed at the higher molding pressure will greatly improve and exceed the minimum commercial requirements for industrial particleboard production.

EXAMPLE 5

Composites/Particleboards Containing Bagasse Fibers

Materials: RUBINATE®1780 ("RN"), a methylene diphenyl diisocyanate binder, was supplied by Huntsman Polyurethanes, USA. (3-triethoxysilylpropyl)-t-butylcarbamate (masked isocyanate silane or MISO) was purchased from Gelest Inc., USA. The sodium hydroxide was supplied by Fisher Scientific, USA. Acetone was obtained from J. T. Baker, USA. It is again noted that other fibers or lignocellulosic fibers/materials may be used in lieu of the bagasse in the systems, processes, methods and examples of the present disclosure.

Fiber Treatments: Bagasse fibers were cut into about 40 mm lengths, and were dried in a vacuum oven at about 50° C. for about 2 hours (moisture content about 4.5%). Some of the bagasse fiber was then subjected to fiber treatments (e.g., surface treatments), as described below.

Alkali Treatment (Mercerization):

Samples of dried bagasse fibers were soaked in about 5% w/v sodium hydroxide solution in water for about 4 hours at room temperature, then washed thoroughly with distilled water until the rinse solution reached a pH of about 7. Each batch of alkaline-treated fibers was then dried at room temperature for about 12 hours, and then dried in a vacuum oven at about 50° C. for about 2 hours (moisture content about 4.5%).

Silane Treatment: (3-triethoxysilylpropyl)-t-butylcarbamate was dissolved in about a 50/50 v/v solution of water and acetone (about 0.1 volume % silane in the solution). The pH was adjusted to about 4 with acetic acid, stirring the solution continuously for about 30 minutes. Some of the dried alkali-treated fibers were then soaked in the solution for about 2 hours.

The fibers were then removed from the silane solution, and the solvent was allowed to evaporate in an air stream at room temperature for about 2 hours. The fibers were dried in a vacuum oven at about 50° C. for about 12 hours (moisture content about 4.5%).

Again, it is noted that the present disclosure contemplates that the silane (e.g., masked isocyanate functional silane) may be incorporated/contacted and/or mixed/blended with the fibers, materials, mixtures, blends and/or samples in a variety of ways, and at various different steps in the fabrication process. For example, the silane (MISO) may be incorporated into the sodium hydroxide solution discussed above, and the fibers may be simultaneously soaked in the NaOH and the silane solution, followed by the drying and composite preparation (e.g., mixing/incorporating with binder and/or molding) steps.

Alternatively, the silane (MISO) may be deposited (e.g., via liquid spraying or the like) onto the lignocellulosic fibers/materials (e.g., after the NaOH treatment), and then the silane-treated fibers may be mixed/incorporated with a binder (if desired) and then molded/fabricated.

It is noted that the lignocellulosic fibers/materials may be mixed/blended with the binder material (if desired) before, during, or after the silane treatment (e.g., silane treatment via liquid spraying or the like). For example, it is noted that the binder material may be contacted/deposited (e.g., via liquid spraying or the like) onto and/or mixed/blended (e.g., as a liquid or solid) with the lignocellulosic fibers/materials before, during or after the silane treatment (e.g., silane liquid spraying treatment, substantially solid-silane mixing step, and/or after silane solution soaking treatment, etc.).

In certain embodiments, the alkali-treatment step (if desired) may be followed by a silane-treatment step where the MISO silane is mixed/contacted with the other components (e.g., fibers/materials and binder) in substantially one step (e.g., a solids mixing step with MISO/MISO powder and/or binder, and/or a liquid spray treatment step with MISO and/or binder, etc.), followed then by a molding/fabrication step. As noted, the silane-treatment step(s) could have several variations, such as, for example, a silane-treatment step where the components (fibers/materials, MISO silane and/or binder) are mixed/blended together as solids, and/or as a step where the MISO silane and/or binder (if desired) is sprayed onto the lignocellulosic fibers/materials (and other solids) as a liquid.

Composite Preparation:

Acetone was mixed with the RN binder to reduce its viscosity. In general, the ratio of the RN binder to acetone for preparation of the binder solution was about 1:2 wt/vol. The binder solution and the alkali and silane treated bagasse fibers were then mechanically mixed for about 5 minutes.

The mixtures (e.g., mixtures obtained via mechanical mixing or the like), blends or samples (about 70 g total for each sample/mixture) of the alkali and silane treated bagasse fibers, along with the RN binder, were then compression-molded at about 160° C. for about 20 minutes, and at about $4 \times 10^6$ N (about 25,000 lb$_f$), in a mold to form about 210×140× 2.74 mm boards.

For the mixtures, blends or samples that were fabricated into the boards listed in Table 16 below, the weight ratio of bagasse fiber to RN was about: (i) 80/20, or (ii) 90/10 by weight percent.

Three Point Bending Tests:

Each fabricated board was cut into samples with dimension of about 117 mm×50 mm×2.74 mm. Modulus of Rupture ("MOR") and modulus of elasticity ("MOE") were measured by three point bending tests with an Instron-1011. The tests were performed with about a 500N load cell, and the cross-head speed was about 2 mm/minute. The testing procedures were conducted according to ASTM D 1037-99, as specified in the ANSI A208.1-1999 standard. The results are displayed in Table 16 below.

TABLE 16

Bagasse-based particleboard testing results:

| Sample | Bagasse Mass % | RN Mass % | MOE, GPa | MOR, MPa |
|---|---|---|---|---|
| 1A | 80 | 20 | 2.3 | 34.9 |
| 2A | 80 | 20 | 2.3 | 34.8 |
| 3A | 80 | 20 | 2.5 | 37.7 |
| Average (samples 1A-3A) | | | 2.37 +− 0.115 | 35.8 +− 1.65 |
| 1B | 90 | 10 | 2.9 | 33.3 |
| 2B | 90 | 10 | 2.8 | 29.6 |
| 3B | 90 | 10 | 2.6 | 29.9 |
| 4B | 90 | 10 | 3.2 | 32.8 |
| Average (samples 1B-4B) | | | 2.88 +− 0.25 | 31.4 +− 1.92 |

Discussion: An exemplary stress strain curve for sample 2A is shown in FIG. 15. It is noted that the stress-strain curves for samples 1A, 2A and 3A looked substantially the same.

According to the ANSI A208.1-1999 standard, shown in Table 11 above, the MOE of the fabricated bagasse fiberboard reached the M−2 grade, and the MOR far exceeded all requirements.

Although the systems, assemblies and methods of the present disclosure have been described with reference to exemplary embodiments thereof, the present disclosure is not limited to such exemplary embodiments and/or implementations. Rather, the systems, assemblies and methods of the present disclosure are susceptible to many implementations and applications, as will be readily apparent to persons skilled in the art from the disclosure hereof. The present disclosure expressly encompasses such modifications, enhancements and/or variations of the disclosed embodiments. Since many changes could be made in the above construction and many widely different embodiments of this disclosure could be made without departing from the scope thereof, it is intended that all matter contained in the drawings and specification shall be interpreted as illustrative and not in a limiting sense. Additional modifications, changes, and substitutions are intended in the foregoing disclosure. Accordingly, it is appropriate that the claims be construed broadly and in a manner consistent with the scope of the disclosure.

What is claimed is:

1. A method for fabricating a particleboard comprising:
   a) soaking a portion of a lignocellulosic material in an alkali solution;
   b) drying the lignocellulosic material after soaking;
   c) soaking a portion of the lignocellulosic material in a masked isocyanate functional silane solution;
   d) drying the lignocellulosic material after soaking; and
   e) molding the lignocellulosic material.

2. The method of claim 1, wherein at least a portion of the lignocellulosic material is derived from natural fibers.

3. The method of claim 1, wherein prior to step a), the lignocellulosic material is dried to a moisture content of from about 3% to about 4.5%.

4. The method of claim 1, wherein step a) is performed by soaking the lignocellulosic material in about a 5% w/v alkali solution for about 4 hours at about room temperature.

5. The method of claim 1, wherein the silane solution includes (3-triethoxysilylpropyl)-t-butylcarbamate.

6. The method of claim 1, wherein the silane solution is prepared by dissolving (3-triethoxysilylpropyl)-t-butylcarbamate in about a 50/50 v/v solution of water and acetone to form about 0.1 volume percent silane in the solution.

7. The method of claim 1, wherein step e) is performed by hot-press molding or compression molding the lignocellulosic material.

8. The method of claim 1, wherein step e) is performed by compression molding the lignocellulosic material at from about 150° C. to about 160° C. for about 7 to 20 minutes at from about 900 $lb_f$ to about 40,000 $lb_f$.

9. The method of claim 1, wherein a binder material is added to the lignocellulosic material after step d) and prior to step e).

10. The method of claim 9, wherein the binder material is selected from the group consisting of wheat gluten, diphenylmethane diisocyanate, and polyurethane.

11. The method of claim 9, wherein a coconut coir pith material is added to the lignocellulosic material after step d) and prior to step e).

12. A method for fabricating a particleboard comprising:
   a) soaking a lignocellulosic material in a masked isocyanate functional silane solution;
   b) drying the lignocellulosic material after soaking; and
   c) molding the lignocellulosic material.

13. The method of claim 12, wherein at least a portion of the lignocellulosic material is derived from natural fibers.

14. The method of claim 12, wherein prior to step a), the lignocellulosic material is dried to a moisture content of from about 3% to about 4.5%.

15. The method of claim 12, wherein the silane solution is prepared by dissolving (3-triethoxysilylpropyl)-t-butylcarbamate in about a 50/50 v/v solution of water and acetone.

16. The method of claim 12, wherein the silane solution includes (3-triethoxysilylpropyl)-t-butylcarbamate.

17. The method of claim 12, wherein step c) is performed by hot-press molding or compression molding the lignocellulosic material.

18. The method of claim 12, wherein a binder material is added to the lignocellulosic material after step b) and prior to step c).

19. The method of claim 18, wherein the binder material is selected from the group consisting of wheat gluten, diphenylmethane diisocyanate, and polyurethane.

20. The method of claim 18, wherein a coconut coir pith material is added to the lignocellulosic material after step b) and prior to step c).

21. A method for fabricating a particleboard comprising:
   a) contacting a portion of a lignocellulosic material with a masked isocyanate functional silane; and
   b) molding the lignocellulosic material.

22. The method of claim 21, wherein at least a portion of the lignocellulosic material is derived from natural fibers.

23. The method of claim 21, wherein the masked isocyanate functional silane includes (3-triethoxysilylpropyl)-t-butylcarbamate.

24. The method of claim 21, wherein before, during or after step a), a binder material is added to the lignocellulosic material prior to step b).

25. The method of claim 21, wherein the masked isocyanate functional silane is contacted with the portion of the lignocellulosic material via liquid spraying.

26. The method of claim 21, wherein step a) includes mixing or blending the masked isocyanate functional silane with the portion of the lignocellulosic material.

27. The method of claim 26, wherein at least a portion of the masked isocyanate functional silane is in powder or substantially solid form.

28. The method of claim 25, wherein prior to step a) at least a portion of the lignocellulosic material is soaked in an alkali solution.

29. The method of claim 26, wherein prior to step a) at least a portion of the lignocellulosic material is soaked in an alkali solution.

30. The method of claim 26, wherein step a) further includes mixing or blending a binder material with the portion of the lignocellulosic material.

* * * * *